US012582949B2

(12) United States Patent
Chiang et al.

(10) Patent No.: US 12,582,949 B2
(45) Date of Patent: Mar. 24, 2026

(54) MAGNETIC STIRRING APPARATUS FOR PRECISE FLUID MANAGEMENT AND FLUID DYNAMICS CONTROL

(71) Applicant: Flxr Engineering Co., Ltd., New Taipei City (TW)

(72) Inventors: Cheng Ching K. Chiang, Wadsworth, OH (US); Sarah Mariska, Jombang (ID); Raphael Bourret, New Taipei City (TW)

(73) Assignee: Flxr Engineering Co., Ltd., New Taipei City (TW)

( * ) Notice: Subject to any disclaimer, the term of this patent is extended or adjusted under 35 U.S.C. 154(b) by 0 days.

(21) Appl. No.: 18/905,379

(22) Filed: Oct. 3, 2024

(65) Prior Publication Data

US 2025/0144583 A1 May 8, 2025

Related U.S. Application Data

(60) Provisional application No. 63/595,978, filed on Nov. 3, 2023.

(51) Int. Cl.
*B01F 33/452* (2022.01)
*B01F 33/81* (2022.01)
*B01F 101/23* (2022.01)

(52) U.S. Cl.
CPC .......... *B01F 33/452* (2022.01); *B01F 33/813* (2022.01); *B01F 2101/23* (2022.01); *B01F 2215/0422* (2013.01)

(58) Field of Classification Search
CPC ..... B01F 33/452; B01F 2101/23; B01F 33/45
See application file for complete search history.

(56) References Cited

U.S. PATENT DOCUMENTS 2,518,758 A 8/1950 Cook
2,951,689 A 9/1960 Asp et al.
(Continued)

FOREIGN PATENT DOCUMENTS

CN 207259499 U 4/2018
CN 210522425 U 5/2020
(Continued)

OTHER PUBLICATIONS

Thermo Fisher. (2019). Thermo Scientific Hotplates and Stirrers. <https://assets.thermofisher.com/TFS-Assets/CMD/brochures/ELED%20Hotplates%20and%20Stirrers_Final%200919.pdf> (Year: 2019).*
(Continued)

*Primary Examiner* — Claire X Wang
*Assistant Examiner* — Patrick M McCarty
(74) *Attorney, Agent, or Firm* — Daniel A. Thomson; Emerson Thomson & Bennett

(57) ABSTRACT

A magnetic stir bar for use with magnetic stir plates, including at least one oriented blade designed to direct liquid flow upward or downward based on blade handedness and rotational direction of the magnetic stir driver. Upon rotational motion of the magnetic stir bar, a combination of axial and radial flow, or mixed-flow is generated within the liquid. The magnetic stir bar is mono-stable and the shape of its head, an area naturally in contact with the magnetic stir plate, allows the magnetic stir bar to rotate either on-axis or off-axis relative to the magnetic stir plate's rotating axis. The magnetic stir bar's unique configuration enables consistent stirring performance across various positions on the magnetic stir plate, including off-center placements. This innovation enhances mixing efficiency and versatility in laboratory and industrial applications, improving overall stirring capabilities in both centered and off-centered configurations.

19 Claims, 13 Drawing Sheets

(56) References Cited

U.S. PATENT DOCUMENTS

| | | | | | |
|---|---|---|---|---|---|
| 3,088,716 | A * | 5/1963 | Stott | B01F 33/45 310/104 |
| 3,245,665 | A | 4/1966 | Steel | |
| 3,554,497 | A | 1/1971 | Zipperer | |
| 3,975,469 | A * | 8/1976 | Fuchs | B01F 23/2331 415/72 |
| 4,371,480 | A * | 2/1983 | Vos | B01F 23/431 261/87 |
| 4,448,685 | A * | 5/1984 | Malina | B01F 23/2331 210/219 |
| 4,911,555 | A * | 3/1990 | Saffer | B01F 33/452 366/274 |
| 6,382,827 | B1 * | 5/2002 | Gebrian | B01F 33/452 366/274 |
| 6,536,936 | B1 * | 3/2003 | Bellasalma | B01F 27/91 366/328.2 |
| 7,748,893 | B2 | 7/2010 | Yaniv et al. | |
| 10,350,561 | B1 | 7/2019 | Dushine et al. | |
| 2001/0055240 | A1 * | 12/2001 | Bruno | B01F 33/453 366/274 |
| 2003/0185096 | A1 * | 10/2003 | Hollstein | B01F 33/4532 366/273 |
| 2004/0022123 | A1 * | 2/2004 | Coville | B01F 33/452 366/273 |
| 2006/0146645 | A1 * | 7/2006 | Rosener | B01F 33/452 366/274 |
| 2010/0246317 | A1 * | 9/2010 | Wilson | B01F 35/2136 366/241 |
| 2011/0051548 | A1 * | 3/2011 | Kar | B01F 27/72 366/293 |
| 2011/0091961 | A1 * | 4/2011 | Haberkorn | B01F 27/91 435/283.1 |
| 2011/0272836 | A1 * | 11/2011 | Keegan | B01F 23/41 366/279 |
| 2015/0329809 | A1 * | 11/2015 | Cifaldi | B01F 33/45 261/93 |
| 2017/0007972 | A1 | 1/2017 | Tien et al. | |
| 2017/0320027 | A1 * | 11/2017 | Morrissey | B01F 33/453 |
| 2018/0043321 | A1 * | 2/2018 | Mochizuki | B01F 27/13 |
| 2018/0126344 | A1 * | 5/2018 | Akerstrom | B01F 33/453 |
| 2018/0313352 | A1 * | 11/2018 | Sandore | F01C 1/24 |
| 2018/0326383 | A1 * | 11/2018 | Kotani | B01L 3/00 |
| 2021/0370247 | A1 * | 12/2021 | Peters | B01F 27/1125 |
| 2024/0207800 | A1 * | 6/2024 | Ellifson | B01F 27/61 |

FOREIGN PATENT DOCUMENTS

| | | | | |
|---|---|---|---|---|
| JP | H07194957 | A * | 8/1995 | |
| JP | 2005081177 | A | 3/2005 | |
| JP | 3919310 | B2 * | 5/2007 | |
| JP | 2007136443 | A | 6/2007 | |
| KR | 101099492 | B1 * | 12/2011 | F24C 7/06 |

OTHER PUBLICATIONS

English translation of CN 207259499U, Lai et al., Apr. 20, 2018, obtained Mar. 12, 2025 from <https://worldwide.espacenet.com/> (Year: 2025).*

Hemrajani, R., Tatterson, G (2004). Mechanically Stirred Vessels. In E.L. Paul, V.A. Atiemo-Obeng, & S.M. Kresta (Eds.) Handbook of Industrial Mixing-Science and Practice (pp. 346-388). John Wiley & Sons. (Year: 2004).*

English translation of JP 2007136443A, Katsuragi, obtained Mar. 13, 2025 from <https://worldwide.espacenet.com/> (Year: 2025).*

Tae Woon Kim; International Search Report; Korean Intellectual Property Office; PCT/US2024/050363; dated Jan. 24, 2025; 5 pages.

Tae Woon Kim; Written Opinion; Korean Intellectual Property Office; PCT/US2024/050363; dated Jan. 24, 2025; 7 pages.

* cited by examiner

MAGNETIC STIRRING APPARATUS FOR PRECISE FLUID MANAGEMENT AND FLUID DYNAMICS CONTROL

CROSS-REFERENCES TO RELATED APPLICATIONS

This application claims the priority benefit of U.S. provisional application No. 63/595,978, filed Nov. 3, 2023, the contents of which are herein incorporated by reference.

FIELD

The present disclosure relates generally to laboratory mixing devices, and more particularly to magnetic stirring bars used in conjunction with magnetic stirring plates. Specifically, the present disclosure relates to a magnetic stir bar design that expands the range of fluid viscosity suitable for effective mixing. This design enhances liquid turnover rate within the vessel and provides controlled directional flow movement.

BACKGROUND

A magnetic stir bar is a common device for laboratory-scale mixing, widely utilized in the field of pharmaceutical, biochemical, chemical and polymer industries. The magnetic stir bar is a method of mixing that operates within a closed system, reducing the risk of contamination and maintaining sterility. Compared to mechanical stirring, the absence of an impeller shaft enhances safety and ease of use. The magnetic stir bar operates by coupling to the driver magnet of the magnetic stirrer, and when the motor rotates, it causes the magnetic stir bar to spin accordingly. Typical rotational speed ranges from 60-1200 RPM in clockwise, counterclockwise, or bi-directional rotation.

The magnetic stir bar typically includes an elongated magnet enclosed in a chemical-resistant material such as PTFE or borosilicate glass. Commonly, magnetic stir bars are rod or bar-shaped, with a circular or a polygonal cross-section. These magnetic stir bars are designed to create fluid dynamics similar to a flat-paddle impeller. The magnetic stir bars' shape is commonly slightly altered to fit vessel's shape or to enhance specific mixing tasks, such as promoting movement of solid particles, with variation such as a triangular shape.

Conventional magnetic stir bars encounter challenges when handling high viscosity mixing, suspensions, and emulsions. In high viscosity mixing, the fluid exhibits high resistance to flow, resulting in a low turnover rate and stagnant regions. The turnover rate is an essential variable in assessing the effectiveness of magnetic stir bars in mixing. The turnover rate refers to the frequency at which the total volume of the fluid is mixed or "turned over" by the action of the magnetic stir bar. Moreover, if the resistance to flow overpowers the coupling force between the magnetic stir bar to the driver magnet, decoupling occurs, causing the magnetic stir bar to stop rotating. Increasing the magnetic field strength by using a stronger magnet is an option; however, the rod-shaped magnetic stir bar generates a sub-optimal flow pattern for high viscosity fluids, limiting the effectiveness of this approach.

In emulsion applications, conventional magnetic stir bars fail to produce high-quality emulsions characterized by small, homogeneously distributed droplet sizes due to their low shear force design. One approach to achieve smaller droplet sizes is to increase the shear rate by increasing the RPM. However, this also generates a singular vortex, leading to unwanted air entrapment.

Thick suspensions pose a similar problem, where particulate matter can obstruct the magnetic stir bar, disrupting its motion and leading to inefficient mixing. The solid particles in the suspension tend to settle at the bottom of the container, and the viscosity of the suspension can change over time with variations in the solids content, complicating the achievement of a uniform suspension. Conventional rod-like magnetic stir bars generate radial flow with a low turnover rate, as the fluid is pushed by the two ends of the magnetic stir bar towards the container's edges. Upon colliding with the walls, the fluid loses momentum before rising to a higher liquid elevation, thereby prolonging the time needed to achieve an even distribution. Furthermore, these magnetic stir bars typically produce a singular vortex, which is ineffective for mixing because most of the flow within the vortex does not intermix. This results in poor mixing efficiency, as the fluid primarily circulates within the vortex without adequately blending with the surrounding fluid.

The present disclosure addresses a fundamental challenge in laboratory magnetic mixing process: the limitations of current "one-size-fits-all" magnetic stir bar designs. While convenient, these universal "rod-like" designs often provide inadequate mixing across the diverse range of applications, fluid viscosity range, and experimental requirements encountered in lab-scale research. This disclosure introduces a magnetic stir bar that broadens the effective mixing range, aiming to create a more versatile "one-size-fits-most" solution. By incorporating the concept of handedness in conjunction with the rotational direction of the magnetic stir driver, this design allows for controlled directional flow—either upward or downward. The introduction of axial flow, complementing the traditional radial flow, increases turnover rates and improves flow paths across a wider spectrum of fluid properties. This innovation seeks to enhance mixing efficiency, reduce unwanted air introduction, and improve overall experimental outcomes without necessitating multiple specialized magnetic stir bar designs for different applications. The goal is to provide researchers and professionals with a single, more adaptable tool that can effectively handle a broader range of mixing tasks, thereby increasing efficiency and reducing the need for application-specific magnetic stir bar configurations.

To determine and optimize performance of product design, CFD simulation provides a wealth of information, particularly crucial parameters in fluid dynamics. Pumping capacity in fluid dynamics refers to the amount of liquid leaving the rotating domain of the magnetic stir bar within a specific time frame under defined conditions. In fluid dynamics, the shear rate is defined as a velocity gradient perpendicular to the direction of flow, which means the quantification of how adjacent layers of fluid move or deform relative to each other. It is a measure of the deformation of the fluid due to applied forces. The shear rate is calculated as the velocity gradient perpendicular to the direction of flow, representing the change in velocity between fluid layers. Vorticity is a vector quantity in fluid dynamics that represents the local spinning motion of the fluid at a point, effectively measuring the tendency of fluid elements to rotate around an axis. High vorticity regions indicate strong rotational motion.

PRIOR ART

Conventional magnetic stir bars typically include a rod-shaped body encapsulating a magnet or a group of magnets.

The magnetic poles are generally parallel to the horizontal plane of the driver magnet to stabilize rotational movement. Various derivative shapes have been designed for specific applications, including: oval-shaped rods for round-bottom flasks, triangular-section shapes for mixing suspensions, and cross shapes for vortex mixing in dissolution processes. Several patents have addressed specific aspects of magnetic stir bar design:

U.S. Pat. No. 2,518,758, issued to G. B. Cook in 1950, disclosed an elongated rod-shaped magnetic stirring apparatus with an oval curvature, suitable for use in curved vessels or round-bottom flasks. U.S. Pat. No. 2,951,689, issued to G. B. Cook in 1960, further refined the curved magnetic stir bar design.

U.S. Pat. No. 3,245,665, issued to J. Y. Steel in 1966, disclosed a magnetic stir bar with two bar magnets positioned within an encapsulating body, designed to overcome magnet synchronization issues regardless of the rotation speed of the driver magnet.

U.S. Pat. No. 3,554,497, issued to M. Zipperer in 1971, disclosed a magnetic stir bar with blades on the surface parallel to the magnetic stir driver's rotational axis to intensify the stirring.

U.S. Pat. No. 7,748,893, issued to Yaniv et al. in 2010, disclosed a magnetic stir bar with an entrance and a discharge port to facilitate fluid movement for partial mixing within the vessel, especially designed to mix liquid gels.

U.S. Pat. App. Pub. No. 2017/0007972 A1, by Tien et al., published in 2016, disclosed a magnetic stir bar having protruding blades and a rounded center enclosing a ring or disc magnet, designed to strengthen the coupling force to driver magnet.

SUMMARY

The present disclosure relates to a magnetic stir bar designed to overcome the limitations of conventional magnetic stir bars while maintaining compatibility with standard magnetic stir plates. This design aims to expand the capabilities of magnetic stirring by controlling and optimizing flow patterns within the liquid.

Conventional magnetic stir bars, typically rod-shaped, have long been utilized in laboratory and industrial settings for mixing solutions. These devices operate by generating shear forces during rotation, creating high shear areas at the rod's ends and inducing radial flow through centrifugal effects. While this design has proven effective for low viscosity solutions, it exhibits several limitations that impact its efficiency and applicability across diverse fluid conditions.

In low viscosity environments, conventional magnetic stir bars perform adequately, facilitating chemical reactions and mixing processes. However, as fluid viscosity increases, particularly above 500 centipoises (cP), the effectiveness of these devices diminishes significantly. This reduction in efficiency is primarily due to the inherent properties of high viscosity fluids. In such fluids, viscous forces dominate over inertial forces, resulting in a tendency for the fluid to remain stationary or quickly return to its original position after disturbance. Consequently, the radial flow generated by conventional magnetic stir bars fails to induce significant movement in the bulk of the fluid, leading to inadequate turnover rates and incomplete mixing.

Furthermore, the performance of conventional magnetic stir bars is compromised in larger volumes, typically exceeding 1,000 milliliters (mL). During operation, these magnetic stir bars generate shear forces upon rotation, producing two primary effects: a) localized high shear areas at the rod extremities, facilitating efficient mixing in the immediate vicinity, and b) radial flow induced by centrifugal effects, which theoretically promotes liquid turnover within the container. In volumes exceeding 1,000 mL, the radial flow generated by the magnetic stir bar often fails to effectively penetrate the entire fluid volume, resulting in non-uniform mixing throughout the container. This reduction in mixing efficiency can be attributed to the limited sphere of influence of the magnetic stir bar relative to the total fluid volume. As the distance from the magnetic stir bar increases, the energy imparted to the fluid dissipates rapidly, leading to substantially diminished fluid motion in regions distal to the magnetic stir bar, particularly in upper layers of the liquid. Consequently, this phenomenon results in inadequate turnover rates and incomplete mixing in larger volume applications.

A notable drawback of the conventional design is the propensity for vortex formation at rotational speeds exceeding 600 revolutions per minute (RPM). This vortex effect, caused by the combination of radial flow and centrifugal forces, can significantly reduce mixing efficiency and inadvertently introduce unwanted air or gas into the solution, potentially altering the chemical or physical properties of the mixture.

A persistent limitation of conventional rod-shaped magnetic stir bars is the occurrence of magnetic decoupling. The torque required for mixing scales with fluid viscosity, rotational speed, and the square of the magnetic stir bar's characteristic length. As rotational speed increases in low viscosity fluids, the drag force on the magnetic stir bar can exceed the magnetic coupling force, leading to decoupling. This phenomenon also occurs in high viscosity fluids, where the increased viscous forces necessitate a higher torque. When the combined effects of viscous and drag forces surpass the maximum available magnetic coupling torque, decoupling ensues, interrupting the mixing process and often requiring manual intervention. While increasing the magnetic field strength could theoretically address decoupling, such an approach fails to address the fundamental deficiency: the rod-shaped geometry generates sub-optimal flow patterns across various fluid conditions.

One aspect of the present disclosure includes a magnetic stir bar with a core made with non-reactive material integrated with one or multiple oriented blades. The oriented blades are configured to propel fluid in a predetermined direction, creating a mixed-flow movement, while the core shape is engineered to further direct and optimize fluid flow. The core encapsulates at least one magnet configured to couple with the driver magnet of a magnetic stir plate.

Another aspect of the present disclosure pertains to the oriented blades integral to the core. The angle and number of blades are optimized through Computational Fluid Dynamics (CFD) analysis. The handedness of the oriented blades, in conjunction with the rotation direction of the magnetic stir bar, generates a mixed-flow path with an axial component directing flow either upward or downward when the magnetic stir bar rotates.

In one aspect of the present disclosure, the oriented blades induce upward liquid motion. The aspect operates by drawing fluid from a lower region (hereinafter referred to as head) and expelling it at an upper region (hereinafter referred to as tail). This fluid motion is particularly beneficial in fluids with viscosity exceeding 500 cP, where turnover rate is essential to mixing efficiency. This aspect facilitates principles of positive displacement: the orientated blades are arranged to create an interconnected pathway to guide the fluid along a predetermined diagonal trajectory, inclined at an angle. This design leverages the concept of boundary layer adhesion and controlled fluid entrainment. Rotation of the blades generates a thin layer of fluid that adheres to the blades' surface. The angled orientation of the blades then directs the fluid layer upward, entraining adjacent fluid volumes in the process. This mechanism establishes a continuous upward flow, effectively countering the tendency of high-viscosity fluids to remain stationary or quickly return to their original position after disturbance.

In another aspect of the present disclosure, the oriented blades induce downward liquid motion, drawing fluid from the upper region (tail) and expelling it at the lower region (head). This configuration demonstrates particular efficacy in heterogeneous phase mixing scenarios, such as organic-to-aqueous phase (emulsion) or liquid-to-solid phase (suspension) systems. The present disclosure leverages principles of controlled fluid displacement and directional flow to achieve its mixing effect. As the magnetic stir bar rotates, the configured angled orientation of the blades generates a downward-directed fluid velocity, guiding the liquid directly to the bottom of the vessel. This mechanism facilitates enhanced dispersion of solids within the liquid phase in suspension systems. In emulsion applications, the downward pumping motion rapidly incorporates the organic phase at lower rotational speeds, initiating efficient mixing of the two phases while mitigating the formation of a singular vortex typically caused by the radial centrifugal force of spinning conventional magnetic stir bars.

A further aspect of the present disclosure pertains to a specialized configuration of the oriented blades optimized for downward pumping in high-shear applications. This configuration is particularly advantageous in emulsion systems where reduction of the organic phase into smaller droplet sizes is desirable. This aspect of the present disclosure utilizes high shear blade design to achieve its effect. As the magnetic stir bar rotates, the oriented blade geometry generates localized regions of high shear stress within the fluid.

Another aspect of the disclosure concerns the configuration and arrangement of the magnetic stir bar, including the core shape, magnet placement, and the curvature of the head and tail. When used in conjunction with an appropriate vessel geometry, these features enable the magnetic stir bar to maintain a tilted spinning axis relative to the stir plate's spinning axis during operation.

The head of the magnetic stir bar is configured with a specific curvature that ensures a single stable position. This design facilitates unique kinematic behaviors, notably precession. In the context of the present disclosure, precession refers to a comparatively slow rotation of the magnetic stir bar's main spinning axis of rotation around a secondary vertical axis. This precession movement generates substantial agitation of the liquid within the vessel without forming a singular vortex, thereby improving mixing efficiency while reducing unwanted effects such as air entrapment.

In one aspect of the present disclosure, the curvature of the head is engineered to allow the magnetic stir bar to maintain a stable tilted axis during operation. In an operation where multiple vessels are places on a single magnetic stir plate, this tilted-axis configuration offers an advantage to enable multiple magnetic stir bars of identical design to exhibit consistent rotational behavior when placed within the effective range of a single driver magnet. Consequently, this feature facilitates uniform and simultaneous mixing across multiple vessels positioned on the same magnetic stirring plate.

The behavior of a given aspect during its usage is highly influenced by the position of its center of mass. First, at the beginning of a mixing process, an adapted position of its center of mass may assist the aspect to successfully couple with the stir plate. Furthermore, when this center of mass is low enough and placed on its rotational axis, this configuration is known as balanced and may allow the aspect to reach a wide range of rotational speed. To arrange the position of the center of mass, an aspect may incorporate to one or a plurality of ballast, nested within.

Disclosed herein is a magnetic stir bar configured for use with a magnetic stir plate, the magnetic stir bar including: a core, a head section interconnected to the core, a tail section interconnected to the core, and a configuration of the core extending from the head section to the tail section. The core includes at least one magnet to couple with a driver magnet of the magnetic stir plate, wherein the core also may include a ballast, wherein the ballast is made of a ferromagnetic material that does not interfere with the magnetic stir bar's magnetic coupling to the driver magnet during operation; at least one oriented blade integrally formed with the core, wherein the at least one oriented blade is configured to propel a liquid in a liquid pumping direction during the rotation of the magnetic stir bar; wherein the orientation of the at least one oriented blade is either left-handed, right-handed, or straight (with some aspects of the present disclosure only having a left-handed orientation or a right-handed orientation); wherein the orientation of the at least one oriented blade, in combination with the rotational direction of the magnetic stir bar, determines the liquid pumping direction upward or downward relative to the magnetic stir plate; wherein the at least one oriented blade is modifiable to accommodate specific vessel shapes; wherein the at least one oriented blade may have variable pitches along its length; and wherein if there are two or more oriented blades, each of the two or more oriented blades have a variable pitch that is independently configurable. The head section interconnected to the core includes a contact area to the vessel, a rotational axis, wherein the magnetic stir bar may spin on the same axis as or on a tilted axis to a stirring axis of the magnetic stir plate; wherein when the rotational axis is tilted relative to the stirring axis of the magnetic stir plate, the magnetic stir bar exhibits a secondary dual-axis motion characterized as a precession motion; in an upward pumping mode, the head section serves as entrance for the liquid; and in a downward pumping mode, the head guides the liquid discharge to a predetermined direction. The tail section interconnected to the core includes: in the upward pumping mode, the tail section guides the liquid discharge to a predetermined direction, and in the downward pumping mode, the tail section serves as entrance for the liquid. The configuration of the core extending from the head section to the tail section serves as a secondary flow guide to direct the liquid to be discharged in a specific mixed flow pattern; and two or more vessels may be stirred using one of the magnetic stir bars in each vessel, wherein the two or more vessels are on the same magnetic stir plate at the same time. The magnetic stir bar may also be a magnetic impeller. Additionally, in applications where multiple magnetic stir bars are used on the same magnetic stir plate simultaneously, the rotation of each magnetic stir bar does not interfere with the rotation of other magnetic stir bars in the adjacent vessels, allowing for simultaneous, consistent, and multi-vessel stirring across multiple vessels positioned on the same magnetic stir plate.

Disclosed herein also is a method of using a magnetic stir bar, the method including the steps of: providing a plurality of vessels, each containing a magnetic stir bar configured to rotate about a rotational axis, wherein the magnetic stir bar may spin on the same axis as, or on a tilted axis to, a stirring axis of the magnetic stir plate; positioning the vessels containing the magnetic stir bars on a single magnetic stir plate, wherein the vessels are arranged within the operational range of a driver magnet contained within the magnetic stir plate; powering on the magnetic stir plate to rotate the driver magnet, thereby inducing a uniform rotation behavior of the magnetic stir bar in their respective vessels within the entirety of effective area of the driver magnet; and generating a mixed-flow pattern within each vessel across the magnetic stir plate, wherein the rotation of each magnetic stir bar does not interfere with the rotation of other magnetic stir bars in the adjacent vessels, allowing for simultaneous, consistent, and multi-vessel stirring across multiple vessels positioned on the same magnetic stir plate. The magnetic stir bar disclosed herein may be used to carry out this method.

The scope of the present disclosure encompasses any and all combinations of the configurations and aspects described herein, provided that the features included in any such combination are not mutually exclusive or incompatible, as would be understood by a person of ordinary skill in the art based on the context, specification, and common knowledge in the field. The present disclosure is not limited to the specific aspects disclosed, and modifications and variations are possible in light of the above teachings or may be acquired from practice of the present disclosure. Additional advantages, aspects, and features of the present disclosure will become apparent from the following detailed description, when considered in conjunction with the accompanying drawings and claims.

BRIEF DESCRIPTION OF THE DRAWINGS

FIG. 1(*b*) illustrates various aspects of the present magnetic stir bar with permutations of different nature.

FIG. 4(*b*) is a schematic illustration of the stirring axis (S) and the rotational axis (P) of a magnetic stir bar aspect self-standing strategy at a high rotational speed in a flat bottom vessel.

FIG. 4(*c*) is a schematic illustration of the stirring axis (S) and the rotational axis (P) of another magnetic stir bar aspect lay-down strategy in a round bottom vessel.

FIG. 4(*d*) is a schematic illustration of the stirring axis (S) and the rotational axis (P) of a magnetic stir bar aspect lay-down strategy in a flat bottom vessel.

FIG. 9(*b*) is a streamline plot of aspect ii with up-pumping mode in a two-dimensional cross-section from CFD.

FIG. 9(*c*) is a streamline plot of aspect ii with down-pumping mode in a two-dimensional cross-section from CFD.

FIG. 9(*d*) is a streamline plot of aspect iii with down-pumping mode in a two-dimensional cross-section from CFD.

FIG. 9(*e*) is a streamline plot of aspect v with down-pumping mode in a two-dimensional cross-section from CFD.

FIG. 9(*f*) is a streamline plot of aspect i with up-pumping mode in a two-dimensional cross-section from CFD.

FIG. 9(*g*) is a streamline plot of aspect i with down-pumping mode in a two-dimensional cross-section from CFD.

DETAILED DESCRIPTION OF THE DISCLOSURE

Figure 1:
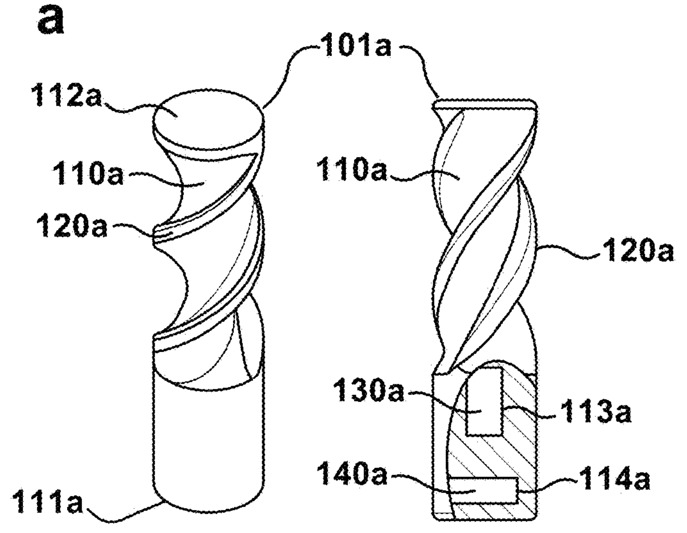
FIG. 1(*a*) illustrates a perspective view and a breakout view of one of the aspects of the present magnetic stir bar.
Figure 1:
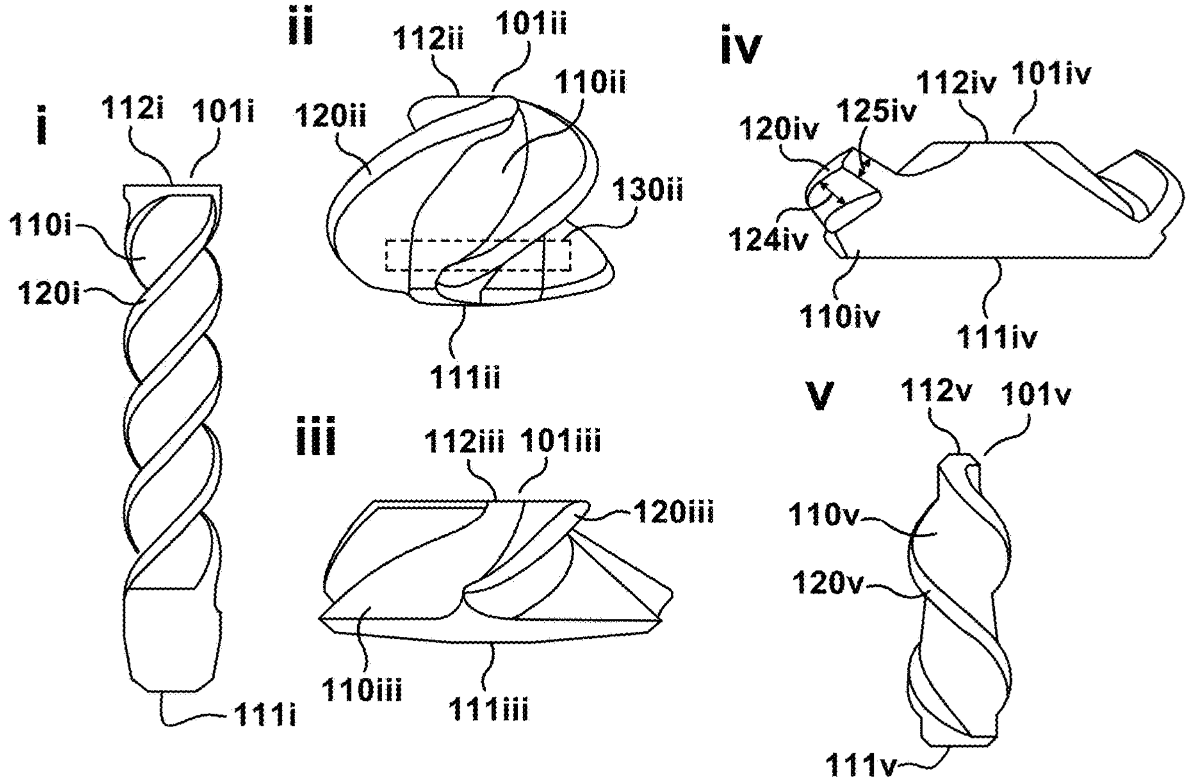

Referring now to the drawings, and more particularly to FIG. 1(*a*), there is illustrated an exemplary magnetic stir bar 101*a* in accordance with the present disclosure. The magnetic stir bar 101*a* includes a core 110*a*, which is the interconnection of a head 111*a* (lower segment) and a tail 112*a* (upper segment). The core 110*a* is configured with at least one cavity: a first cavity 113*a* adapted to house a magnet 130*a* for coupling with an external driver magnet 311, and a secondary cavity 114*a* designed to accommodate a ballast 140*a* for adjusting the center of mass to enhance operational stability. Integrally formed with the core 110*a* are one or more blades 120*a*. In one aspect of the present disclosure, both the core 110*a* and the blades 120*a* are constructed from non-reactive materials to ensure chemical compatibility across a wide range of applications. The configuration of the core 110*a* and the integral blades 120*a* facilitates controlled fluid dynamics across a range of viscosity and volumes. In one aspect of the present disclosure, the magnet 130*a* is a magnet with a magnetic flux that is stable across a temperature range of −100-220° C. and that resists demagnetization from external magnetic fields. In one aspect of the present disclosure, the ballast 140*a* is made of a ferromagnetic material that does not interfere with the magnetic coupling to the driver magnet during operation. This configuration allows for precise tuning of the balance and stability of the magnetic stir bar 101*a* design.

One aspect of the present disclosure discloses a magnetic stir bar design including four features, each feature contributing to enhanced mixing capabilities. The first feature is one or more oriented blades 120*a*, which serve as the primary fluid dynamic elements. These blades 120*a* are configured to generate and direct fluid flow during operation. The second feature is a core 110*a*, which serves a dual purpose: it provides a housing for the magnet(s) 130*a*, ensuring its placement and orientation, and functions as a flow director, working in tandem with the oriented blades 120*a* to guide the generated fluid flow along predetermined pathways. The third feature includes one or more magnets 130*a*, for operational coupling with an external driver magnet 311. This magnetic element facilitates the transfer of rotational motion from a magnetic stir plate to the magnetic stir bar. The fourth feature is a ballast 140*a*, which, when incorporated into the design, serves to improve the operational stability of the magnetic stir bar 101*a*. This ballast allows for fine-tuning of the device's center of mass, enabling smooth and consistent rotation.

The core 110*a* feature is configured to minimize resistance to liquid flow while providing sufficient volume for housing the magnets 130*a*. This configuration ensures the structural integrity of the magnetic stir bar and facilitates the recovery of the magnetic stir bar after use. The core 110*a* may also be contoured to guide liquid propelled by the blades 120*a* in a specific direction, enhancing flow pattern precision. The head 111*a* of the core 110*a* is in constant contact with the vessel, influencing its position and movement during operation. The opposite end of the head 111*a* is the tail 112*a*. The shape of the head 111*a* is circular to allow a smooth rotational movement. In one aspect of the present disclosure, the dimensions of the core 110*a* range from about 2 mm to about 500 mm. In another aspect of the present disclosure, the dimensions of the core 110*a* range of about 5 mm to about 150 mm.

Another aspect of the present disclosure pertains to a magnet 130*a* for coupling with external driver magnets to enable controlled rotational motion. This aspect incorporates at least one magnet 130*a*, securely housed within respective inner cavities 113*a* in the core 110*a*. The magnetic orientations of these magnets 130*a* can be varied to achieve specific, predetermined movement patterns of the magnetic stir bar 101*a*. The magnets 130*a* are designed with optimized shapes and dimensions to be integrated within the core 110*a* to ensure reliable movement of the magnetic stir bar 101*a*, and cost-effective manufacturing. The shapes of the magnets 130*a* encompassed by this aspect of the present disclosure include, but are not limited to, cubes, cuboids, cylinders, triangular prisms, hexagonal prisms, and parallelepipeds, allowing for flexibility in design and performance optimization. In one aspect of the present disclosure, the dimensions of these magnets 130*a* range from about 0.5 mm to about 100 mm. In another aspect of the present disclosure, the dimensions of these magnets 130*a* range from about 1.5 mm to about 20 mm.

In one aspect of the present disclosure, the overall shape of the magnetic stir bar 101*a* is designed to enable introduction and recovery into and from the targeted vessel 301. In using a magnetic stir bar retriever, a conventional tool for recovering magnetic stir bars, the magnetic stir bar shape, weight and magnet 130*a* placement have to be adapted. A ballast 140*a* can be integrated into the design to participate in the movement stability. In one aspect of the present disclosure, the overall shape height dimensions of the magnetic stir bar 101*a* are between about 0.5 mm and about 500 mm. In yet another aspect of the present disclosure, the overall shape height dimensions of the magnetic stir bar 101*a* are between about 1 mm and about 250 mm. In one aspect of the present disclosure, the overall shape diameter dimensions of the magnetic stir bar 101*a* are between about 0.5 mm and about 600 mm. In yet another aspect of the present disclosure, the overall shape diameter dimensions of the magnetic stir bar 101*a* are between about 1 mm and about 300 mm.

Figure 4:
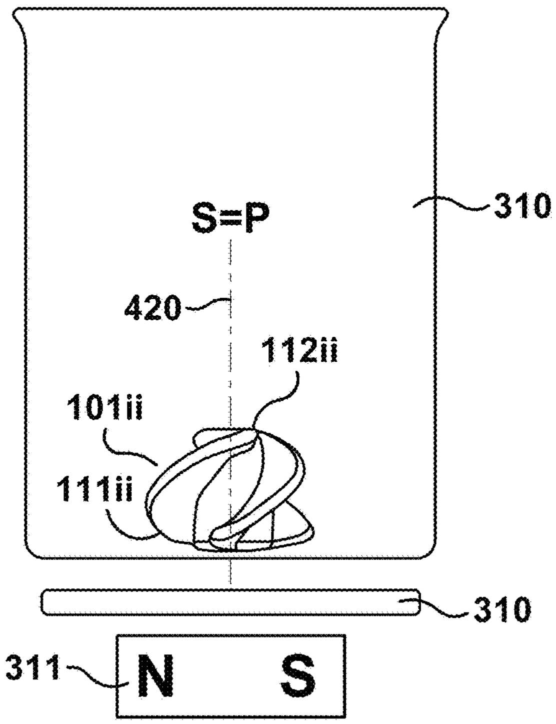
FIG. 4(*a*) is a schematic illustration of the stirring axis (S) and the rotational axis (P) of a magnetic stir bar aspect self-standing strategy at a low rotational speed in a flat bottom vessel.
Figure 4:
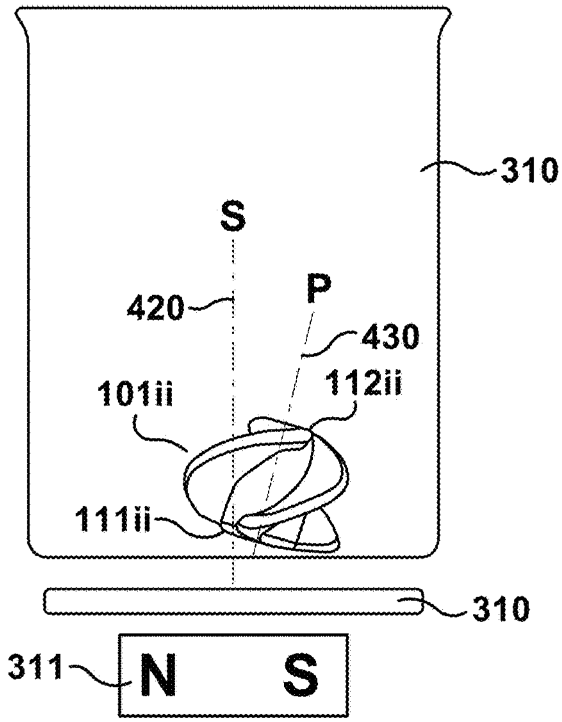
Figure 4:
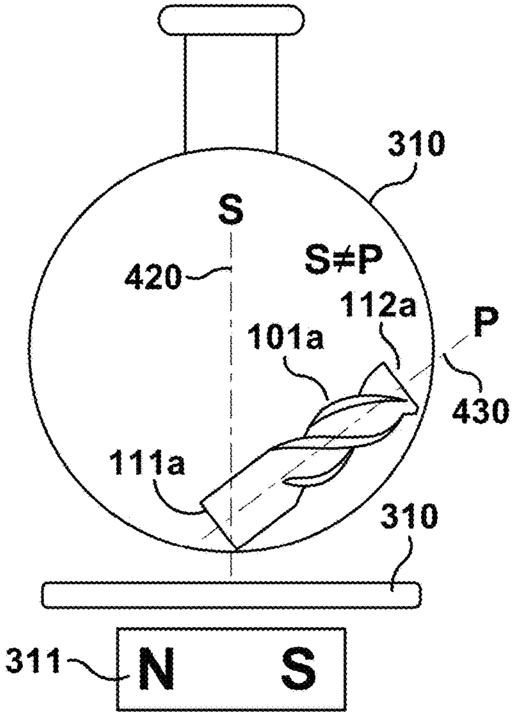
Figure 4:
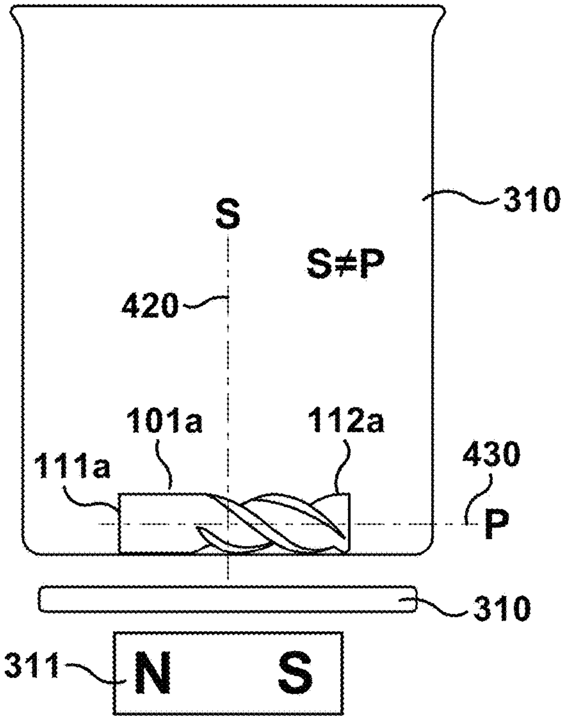
Figure 5:
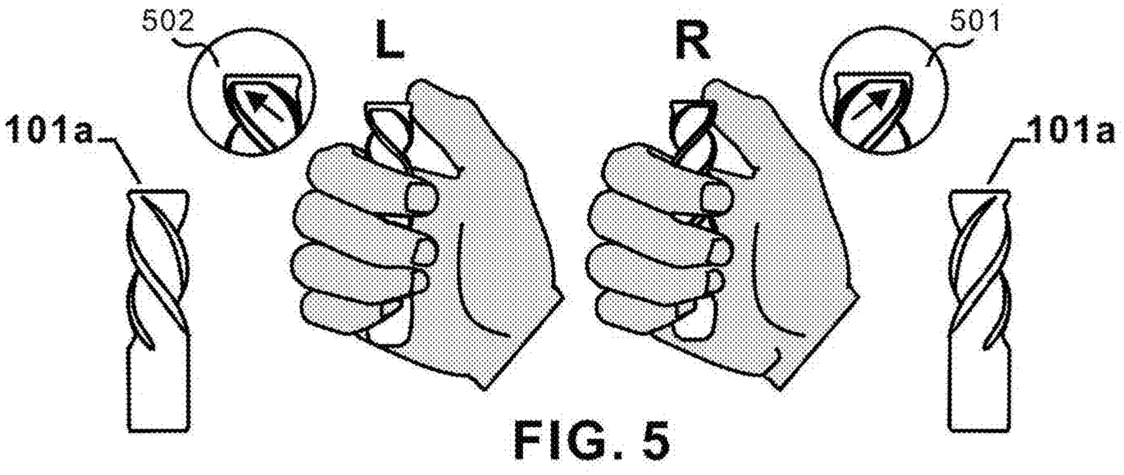
FIG. 5 is a representation of the difference between the two possible handednesses a given aspect may possess.

One aspect of the present disclosure discloses that the arrangement of the magnetic stir bar 101*a* and the magnet cavity 113*a* placement are engineered to promote a single, stable movement pattern during operation. The center of mass of the magnetic stir bar 101*a* is positioned to maintain stability at higher rotational speeds. This aspect of the present disclosure employs two primary strategies to achieve this stable movement: a self-standing strategy and a lay-down strategy. The self-standing strategy, as shown in FIGS. 4(*a*) and 4(*b*), is where, in one aspect of the present disclosure, the tail 111*ii* of the magnetic stir bar 101*ii* is in contact with the vessel 301, and the head 112*ii* of the magnetic stir bar 101*ii* is not in contact with the 301. The lay-down strategy, as shown in FIGS. 4(*c*) and 4(*d*), is where, in one aspect of the present disclosure, the tail 111*a* and the head 112*a* of the magnetic stir bar 101*a* are in contact with the vessel 301.

The present disclosure further encompasses permutations of key elements of the magnetic stir bar arrangement to optimize performance for specific applications, as illustrated in FIG. 1(*b*) (i)-(v): (i) an aspect of the present disclosure featuring an extended core 110*i*, designed to optimize mixing in vessels with increased height or volume; (ii) an aspect of the present disclosure with a shortened core 110*ii* and modified head 111*ii* engineered to enhance movement stability during operation; (iii) an aspect of the present disclosure in which the core 110*iii* assumes a conical shape, configured to optimize mixing efficiency for specific reaction conditions or fluid properties; (iv) an aspect of the present disclosure featuring a cuboid-shaped core 110*iv* with modified blades 120*iv*, specifically designed to facilitate access and operation in vessels with narrow necks or restricted openings, with a blade length 124*iv* and a blade width 125*iv*; (v) an aspect of the present disclosure featuring a head 111*v* with reduced dimensions, optimized to enhance the magnetic stir bar's movement and efficiency during usage. These various modifications demonstrate the versatility and adaptability of the present disclosure, allowing for customization to meet diverse requirements across a wide range of mixing applications.

In one aspect of the present disclosure, the pitch of the oriented blade 120*a* is the distance along an axis that runs through the center of the core 110*a* from the head 111*a* to the tail 112*a* which the oriented blade 120*a* travels after one full rotation either clockwise or counterclockwise around the core 110*a*. In another aspect of the present disclosure, the pitch of the oriented blades 120*i*, 120*ii*, 120*iii*, 120*iv*, and 120*v* is the distance along an axis that runs through the center of the cores 11Θ0, 110*ii*, 110*iii*, 110*iv*, and 110*v* respectively from the heads 111*i*, 111*ii*, 111*iii*, 111*iv*, and 111*v* respectively to the tail 112*i*, 112*ii*, 112*iii*, 112*iv*, and 112*v* respectively which the oriented blades 120*i*, 120*ii*, 120*iii*, 120*iv*, and 120*v* travel after one full rotation either clockwise or counterclockwise around the cores 11Θ0, 110*ii*, 110*iii*, 110*iv*, and 110*v* respectively. In one aspect of the present disclosure, the pitch of the oriented blade 120*a* may be constant or variable along the length of the oriented blade 120*a*. In another aspect of the present disclosure, the pitch of oriented blades 120*i*, 120*ii*, 120*iii*, 120*iv*, and 120*v* may be constant or variable along the length of oriented blades 120*i*, 120*ii*, 120*iii*, 120*iv*, and 120*v* respectively.

Figure 2:
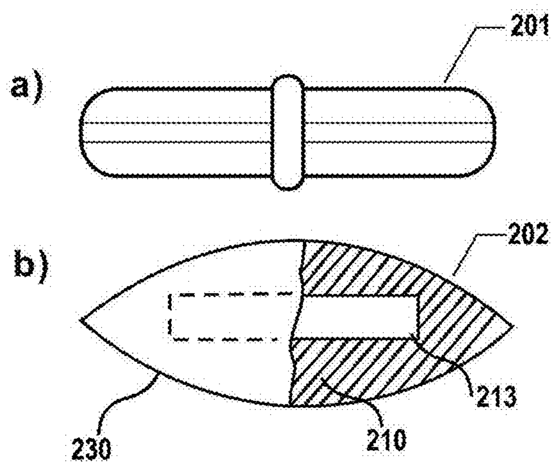
PRIOR ART FIG. 2
FIG. 2 represents a plan view and a breakout view of two conventional magnetic stir bar aspects.

FIG. 2 showcases two conventional stir bars 201 and 202. FIG. 2 further showcases the components of the conventional stir bar 202, including a bar magnet 213, an ellipsoidal shell 230, and a body 210.

Figure 3:
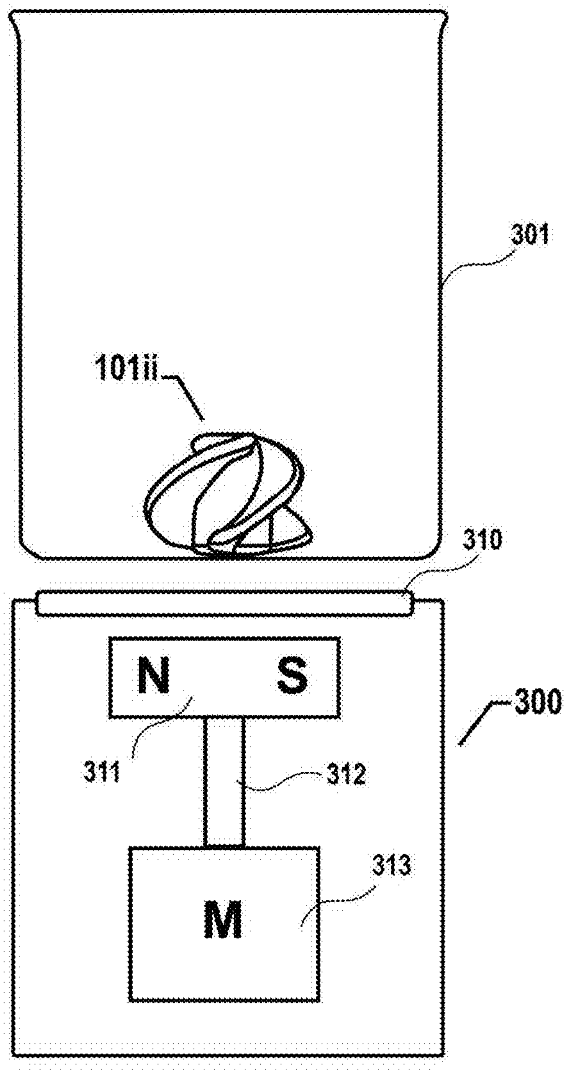
FIG. 3 represents a schematic illustration of a magnetic stir bar placed into a vessel, which is positioned on the top of a magnetic stir driver.

As described in FIG. 3, the magnetic stir driver 300 includes an electric motor 313 driving a magnet 311 through a shaft 312. The vessel 301, containing the solution to mix, is placed on the top of the magnetic stir plate 310, centered on the rotational axis of the stir plate's driver magnet 311. The magnetic stir bar 101*ii* is placed within the vessel 301 and the activation of the stir driver's electric motor 313 drives the magnetic stir bar 101*ii* into a rotational movement.

FIG. 4(*a*) illustrates the operation of the present disclosure. A magnetic stirring system includes the vessel 301, the driver magnet 311 of the magnetic stir plate, and a magnetic stir bar 101*ii*, in which a magnet 130*ii* is disclosed in FIG. 1(*b*). The strength of this magnetic coupling is determined by factors including, but not limited to, the magnetic flux originating from each magnet 130*ii*, their respective dimensions, and their relative positioning. This coupling facilitates the transmission of the torque generated by the driver magnet 311 to the magnetic stir bar 101*ii* during operation. As the driver magnet 311 rotates about its stirring axis (S) 420, the magnetic stir bar 101*ii* synchronously rotates about its rotational axis (P) 430. This synchronization is maintained regardless of the angle between the stirring axis (S) 420 and the rotational axis (P) 430, ensuring efficient mixing within the vessel 301. However, if the torque required to maintain rotation exceeds the strength of the magnetic coupling between the magnetic stir bar 101*ii* and the driver magnet 311, decoupling may occur. In such an event, the magnetic stir bar 101*ii* disengages from the synchronized rotation, resulting in the cessation of the mixing process.

Referring to FIG. 4(*b*), the present disclosure establishes a novel axis convention to describe the spatial orientation and rotational dynamics of the magnetic stir bar system. For the purposes of this disclosure, the spinning axis of the driver magnet 311 is designated as stirring axis (S) 420 and the spinning axis of the magnetic stir bar 101*ii* is designated as rotational axis (P) 430. In conventional magnetic stir bar designs, stirring axis (S) 420 and the rotational axis (P) 430 are typically collinear. However, the present disclosure introduces configurations wherein the stirring axis (S) 420 and the rotational axis (P) 430 may be non-collinear, depending on the desired magnetic stir bar movement and mixing requirements.

In one aspect of the present disclosure, the angle between the stirring axis (S) 420 and the rotational axis (P) 430 is between about 0° to about 90°. In another aspect of the present disclosure, the angle between the stirring axis (S) 420 and the rotational axis (P) 430 is between about 0° to about 25°. In yet another aspect of the present disclosure, the angle between the stirring axis (S) 420 and the rotational axis (P) 430 is between about 22° to about 65°. In yet another aspect of the present disclosure, the angle between the stirring axis (S) 420 and the rotational axis (P) 430 is between about and between about 40° to about 90°. It is noted that in standard laboratory practice, stirring axis (S) 420 is predominantly oriented vertically with respect to the supporting surface. This vertical orientation of stirring axis (S) 420 serves as a reference point for describing the relative orientation of the rotational axis (P) 430 in this aspect of the present disclosure. The ability to manipulate the relative orientation of the stirring axis (S) 420 and the rotational axis (P) 430 enables control over fluid dynamics and mixing efficiency.

In one aspect of the present disclosure, in reference to FIG. 4(*b*), the magnetic stir bar 101*ii* is mono-stable and the shape of its head 111*ii*, an area naturally in contact with the magnetic stir plate, allows the magnetic stir bar 101*ii* to rotate either on the stirring axis (S) 420 and the rotational axis (P) 430. The magnetic stir bar's 101*ii* unique configuration enables consistent stirring performance across various positions on the magnetic stir plate, including off-center placements.

In one aspect of the present disclosure, which utilizes the self-standing strategy, referring now to FIG. 1(*b*), aspect ii, the magnetic stir bar 101*ii* features a large head 111*ii* area, a low positioning of the magnet 130*ii* and a low center of mass position, combined to generate a single stable standing position. At between about 60 to about 700 RPM, the stirring axis (S) 420 and the rotational axis (P) 430 are aligned, as illustrated in FIG. 4(*a*), with the contact area between the magnetic stir bar 101*ii* and the vessel 301 being a point. At a rotational speed exceeding about 700 RPM, dynamic phenomena, including centrifugal force, displace the magnetic stir bar 101*ii* from the magnetic stir plate's stirring axis (S) 420. The positioning of the magnet 130*ii* causes the head 111*ii* of the magnetic stir bar 101*ii* to remain closer to the stirring axis (S) 420 compared to the tail 112*ii*, resulting in a tilted magnetic stir bar rotational axis (P) 430, as depicted in FIG. 4(*b*). Due to the shape of the head 111*ii*, the nature of the contact area between the magnetic stir bar 101*ii* and the vessel 301 transforms into a circle, triggering a low-speed secondary rotational movement around the stirring axis (S) 420. This double axis rotational movement bears similarity to the torque-induced precession movement, albeit with distinct underlying mechanisms. In one aspect of the present disclosure, the angle between the stir bar's 101*ii* rotational axis (P) 430 and the stirring axis (S) 420 is between about 0° to about 35°. In another aspect of the present disclosure, the angle between the stir bar's 101*ii* rotational axis (P) 430 and the stirring axis (S) 420 is between about 0° to about 25°.

In another aspect of the present disclosure which utilizes the lay-down strategy, referring now to FIGS. 4(*c*) and (*d*), is designed to have a slim-shaped head 111*a*, a slim and circular-shaped tail 112*a* and dimensions tailored to the target vessel 301. This configuration causes the magnetic stir bar 101*a* to naturally lay down into the side walls of vessel 301, with the head 111*a* oriented towards the center of the stir plate's driver magnet 311. The tail 112*a* maintains contact with the wall of vessel 301, typically at a higher position. As a result, the magnetic stir bar rotational axis (P) 430 is tilted relative to the magnetic stir plate stirring axis (S) 420, as illustrated in FIG. 4(*c*). The angle between the stirring axis (S) 420 and the rotational axis (P) 430 is dependent on the shape of the vessel 301, the dimensions of the magnetic stir bar 101*a* and the position of the magnet 130*a*. In one aspect of the present disclosure, the angle between the stirring axis (S) 420 and the rotational axis (P) 430 is between about 30° to about 90°. In another aspect of the present disclosure, the angle between the stirring axis (S) 420 and the rotational axis (P) 430 is between about 40° to about 90°. In one aspect of the present disclosure, the contact area between the magnetic stir bar 101*a* and the vessel 301 are two circles: one at the head 111*a*, and one at the tail 112*a*. The friction generated during the primary rotational movement, combined with the magnetic forces, induces a secondary rotational movement of the magnetic stir bar 101*a* around the stirring axis (S) 420. This double axis rotational movement can also be broadly likened to the torque-induced precession movement.

Figure 9:
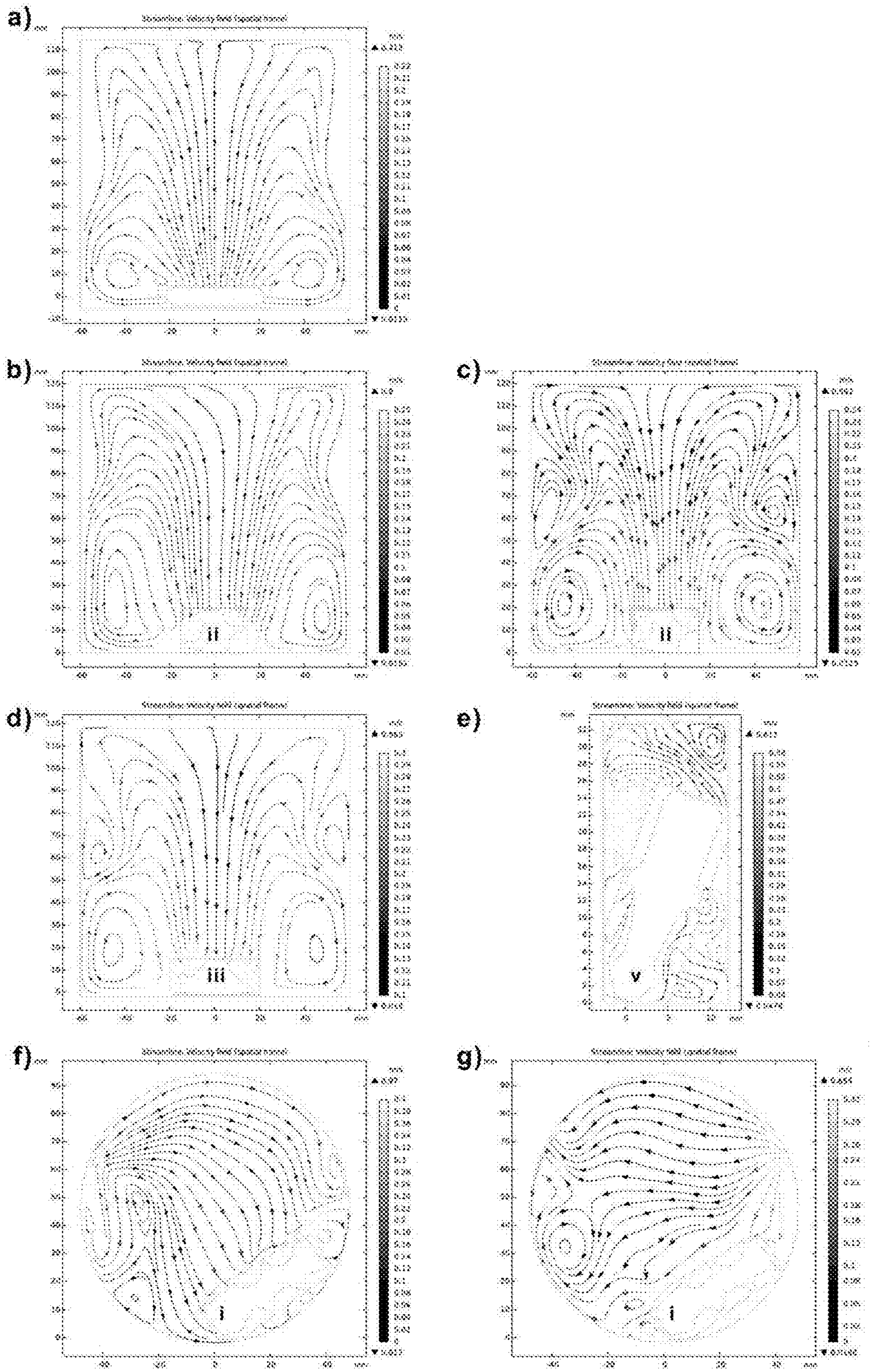
FIG. 9(*a*) is a streamline plot of the conventional bar-shaped magnetic stir bar in two-dimensional cross-section from CFD.

In yet another aspect of the present disclosure which utilize the lay-down strategy in narrow vessel, referring now to FIG. 9(*e*), the shape of a narrow vessel combines to an adapted shape of the magnetic stir bar 101*v* generates an angle between its rotational axis (P) 430 and the stirring axis (S) 420 is between about 15° to about 80°. In yet another aspect of the present disclosure, the angle between the rotational axis (P) 430 and the stirring axis (S) 420 of the magnetic stir bar 101*v* is between about 220 to about 65°.

One aspect of the present disclosure is characterized by a distinct handedness, which defines the directional orientation of the blades 120*a* as they wind around the core 110*a*. In this aspect of the present disclosure, the magnetic stir bar 101*a* is configured in either a right-handed configuration 501 or a left-handed configuration 502. In the right-handed configuration 501, the blades 120*a* follow a helical path such that, when viewed axially from either end of the core 110*a*, the blades 120*a* wind in a clockwise direction as they progress along the length of the core 110*a*. Conversely, in the left-handed configuration 502, the blades 120*a* wind in a counterclockwise direction when viewed axially from either end of the core 110*a*. To further elucidate, in the right-handed configuration 501, if an observer were to grasp the axis of the core 110*a* with their right hand such that their thumb points towards the tail 112*a*, their fingers would curl in the same direction as the helical path of the blades 120*a*. The left-handed configuration 502 is the mirror image of the right-handed configuration 501.

In the operation of one aspect of the present disclosure, two distinct fluid flow patterns contingent upon the handedness of the device and the rotational direction of the driver magnet are generated. These patterns are characterized as up-pumping and down-pumping flows.

In one aspect of the present disclosure which exhibits a right-handed configuration 501, the following fluid dynamics are observed. a) When coupled with a clockwise-rotating driver magnet 311, this aspect of the present disclosure induces a fluid flow directed upward in a conical path, guided by the inclined surfaces of the blades 120*a*. b) Conversely, when coupled with a counterclockwise-rotating driver magnet 311, the same device induces a conical fluid flow directed downward, utilizing the same inclined surfaces of the blades 120*a*.

In another aspect of the present disclosure which exhibits a left-handed configuration 502, the fluid dynamics are inverted. a) Coupling with a counterclockwise-rotating driver magnet 311 results in a conical upward fluid flow. b) Coupling with a clockwise-rotating driver magnet 311 produces a conical downward fluid flow.

In one aspect of the present disclosure, the oriented blades include one or more blades 120*i*, ranging in number from one to twelve, with their specific arrangement, quantity, profiles, and dimensions strategically designed to accommodate a predetermined range of operational parameters. These parameters include, but are not limited to, rotational speed range, fluid viscosity range, desired overall flow pattern, and specific vessel geometry. The characteristics of the fluid and the desired mixing pattern are then computed and optimized via CFD. This analysis leads to a functional division of the blade profiles into three distinct zones: 1) intake zone 621*i*, 2) transport zone 622*i*, and 3) discharge zone 623*i*. Referring to the FIG. 6, the intake zone 621*i* is proximal to the tail 112*i* of the magnetic stir bar 101*i* from FIG. 1(*b*), aspect i. In up-pumping mode, it functions as the discharge zone, while in down-pumping mode it serves as the intake zone. The discharge zone 623*i* is proximal to the head 1*i*E of the magnetic stir bar 101*i*. In up-pumping mode, it functions as the intake zone 621*i*, while in down-pumping mode it serves as the discharge zone. The transport zone 622*i* is situated between the intake zone 621*i* and the discharge zone 623*i*, it functions as the transportation zone for both modes. This three zone configuration approach simplifies results from the CFD simulation to optimize fluid dynamics across applications.

Figure 6:
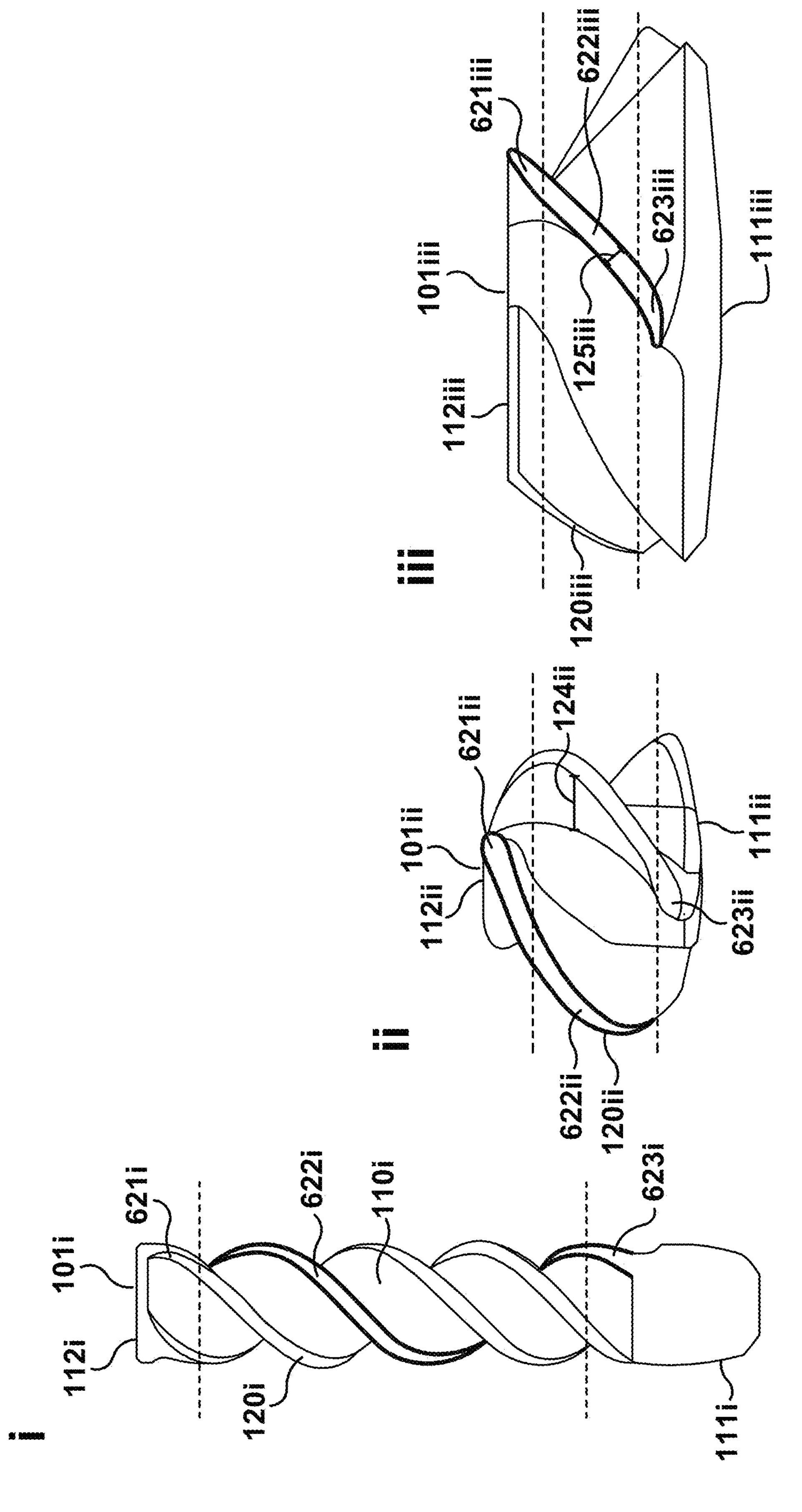
FIG. 6 is a schematic illustration displaying the different zones of aspects i, ii, and iii.

In another aspect of the present disclosure, with respect to FIG. 6, the width 124*ii* of the magnetic stir bar 101*ii* from FIG. 1(*b*), aspect ii, defines the outer perimeter of a rotating domain around its spinning axis to the position of the edges of the blades 120*ii*. In one aspect of the present disclosure, the blades 120*ii* width 124*ii* span a range of about 0.3 mm to about 180 mm. In another aspect of the present disclosure, the blades 120*ii* width 124*ii* span a range of about 0.5 mm to about 80 mm. The width 124*ii* can be constant or variable along the blades 120*ii*, starting from the intake zone 621*ii*, going through the transport zone 622*ii*, and extending to the discharge zone 623*ii*.

In yet another aspect of the present disclosure, with respect to FIG. 6, the magnetic stir bar 101*iii* from FIG. 1(*b*), aspect iii, featuring variable width blades 120*iii*, is strategically designed to manipulate fluid compression. In one aspect of the present disclosure, the thickness 125*iii* of oriented blade 120*iii* ranges from about 0.3 mm to about 50 mm. In another aspect of the present disclosure, the thickness 125*iii* of oriented blade 120*iii* ranges from about 0.5 mm to about 30 mm. The thickness 125*iii* can also be constant or variable along the length of the oriented blade 120*iii*, from the intake zone 621*iii*, through the transport zone 622*iii*, to the discharge zone 623*iii*. These variable width and thickness configurations allow for control over fluid dynamics and ensure sufficient strength of the blade 120*iii* against deformation.

In another aspect of the present disclosure, the liquid path is the volume defined by the rotating domain subtracted of the body of the core 110*i* and the bodies of the blades 120*i*.

In one aspect of the present disclosure, the intake zone 621*i* is characterized by an expansion of the liquid path cross-section along the core 11Θ0, generating a low-pressure region that induces liquid flow into the magnetic stir bar 101*i*. The transport zone 622*i* is characterized by a relatively constant liquid path cross-section, with the purpose of forcibly moving the liquid axially along the magnetic stir bar 101*i*. This transport zone 622*i* facilitates vertical displacement of the fluid, ensuring that fluid from different layers is continuously intermixed. The discharge zone 623*i* is characterized by a reduction of the liquid path cross-section, with the purpose of discharging the liquid in a predetermined direction.

In one aspect of the present disclosure, a bi-directional configuration is characterized by its capacity to generate an overall flow going either in an upward or downward direction, depending on its spinning direction. In this configuration, the intake zone 621*i*, responsible for drawing in the fluid, can be positioned at either the top or bottom of the magnetic stir bar 101*i*. The fluid subsequently flows through the transport zone 622*i* in the midsection, where it undergoes axial layer transport and acceleration induced by the rotating magnetic stir bar. Finally, the fluid exits through the discharge zone 623*i* situated at the opposite end of the device where it undergoes directional manipulation. A mono-directional configuration is characterized by a design optimized for one working direction, typically from top to bottom.

Figure 13:
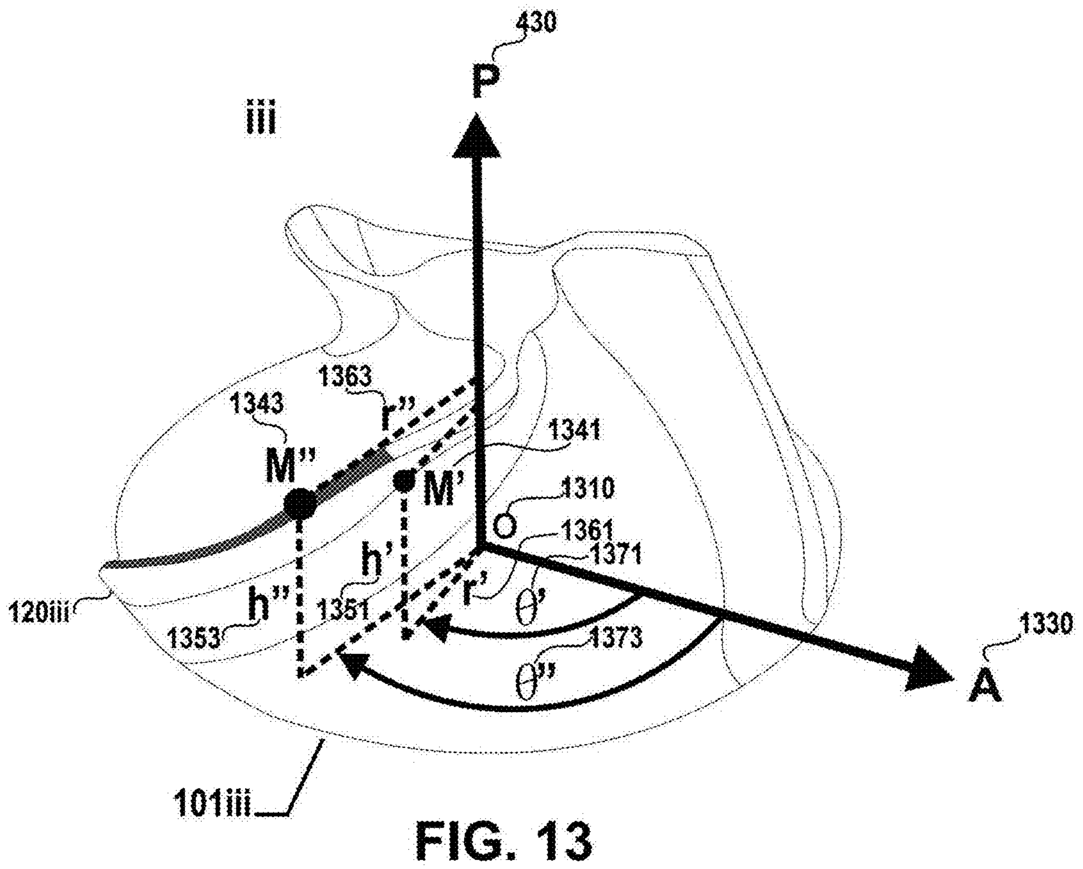
FIG. 13 is an exemplary schematic illustration of the blade's curve geometry in cylindrical coordinate system.

Referring to FIG. 13, the blade shapes are described using a cylindrical coordinate system, wherein the longitudinal axis is the stir bar's natural rotational axis (P) 430, traversing from the head to the tail of the design. The polar axis (A) 1330 is the axis perpendicular and secant to the rotational axis (P) 430 and going through the lowest point of the blade. The origin (O) 1310 of the system is defined by the intersection between the rotational axis (P) 430 and the polar axis (A) 1330.

Within the cylindrical coordinate system, any point M is defined by three parameters. The radial coordinate (r), representing the perpendicular distance from point M to the rotational axis (P) 430. The angular coordinate (0), defined in the plane perpendicular to the rotational axis (P) 430 between the polar axis (A) 1330 and the projection of the point M's position vector. The axial coordinate (h), defined by the distance traveled along the rotational axis (P) 430 from the origin to the projection of point M.

Each blade of the stir bar includes a band of material characterized by a specified length and thickness. The anchor of the blade on the surface of the core is the blade root, further designated as point M' 1341. The free blade edge, extending from the blade root, further designated as point M" 1343. The positions of M' 1341 and M" 1343 are described by the following mathematical system of equations:

For any point M' of a blade's edge or M" from a root's curve, its coordinates follow the equation systems:

$$M' = \begin{cases} (1')\ r' = R_2'h^2 + R_1'h + R_0' \\ (2')\ \theta' = \Theta_2'h^2 + \Theta_1'h + \Theta_0' \\ (3')\ h' = h \end{cases}$$

$$M'' = \begin{cases} (1'')\ r'' = R_2''h^2 + R_1''h + R_0'' \\ (2'')\ \theta'' = \Theta_2''h^2 + \Theta_1''h + \Theta_0'' \\ (3'')\ h'' = h \end{cases}$$

These equation systems contain three equations, wherein r' 1361 and r" 1363 represent the radial distance of the points M' 1341 and M" 1343 respectively from the rotational axis (P) 430 in millimeters (mm), θ' 1371 and θ" 1373 represent the angular coordinate of the points M' and M" respectively to the polar axis (A) 1330 in degrees (°), h' 1351 and h" 1353 represent the height of the point M' and M" respectively along the rotational axis (P) 430 in millimeters (mm), and $R_2'$, $R_1'$, $R_0'$, $\Theta_2'$, $\Theta_1'$, $\Theta_0'$ and $R_2''$, $R_1''$, $R_0''$, $\Theta_2''$, $\Theta_1''$, $\Theta_0''$ all represent constants determined by the given aspect's specifications.

In one aspect of the present disclosure, the values of the constants in equations (1') and (1") may fall within the following ranges: $R_2'$ and $R_2''$ may fall within the range of about $-150\ mm^{-1}$ and about $150\ mm^{-1}$, $R_1'$ and $R_1''$ may fall within the range of about −300 and about 300, and $R_0'$ and $R_0''$ may fall within the range of about 0 mm and about 1000 mm. In another aspect of the present disclosure, the values of the constants in equations (1') and (1") may fall within the following ranges: $R_2'$ and $R_2''$ may fall within the range about $-90\ mm^{-1}$ and about $90\ mm^{-1}$, $R_1'$ and $R_1''$ may fall within the range of about −120 and about 120, and $R_0'$ and $R_0''$ may fall within the range of about 0.5 mm and about 500 mm.

In one aspect of the present disclosure, the values of the constants in equations (2') and (2") may fall within the following ranges: $\Theta_2'$ and $\Theta_2''$ may fall within the range of about $-160°\cdot mm^{-2}$ and about $160°\cdot mm^{-2}$, $\Theta_1'$ and $\Theta_1''$ may fall within the range of about $-180°\cdot mm^{-1}$ and about $180°\cdot mm^{-1}$, and $\Theta_0'$ and $\Theta_0''$ may fall within the range of about 0° and about 360°. In another aspect of the present disclosure, the values of the constants in equations (2') and (2") may fall within the following ranges: $\Theta_2'$ and $\Theta_2''$ may fall within the range of about $-100°\cdot mm^{2}$ and about $100°\cdot mm^{-2}$, $\Theta_1'$ and $\Theta_1''$ may fall within the range of about $-95°\cdot mm^{-1}$ and about $95°\cdot mm^{-1}$, and $\Theta_0'$ and $\Theta_0''$ may fall within the range of about 0° and about 360°.

In one aspect of the present disclosure, the value of the variables in equations (3') and (3") may fall within the following range: the maximum height of both root and edge curves, h' and h", fall within the range of about 0.5 mm to about 300 mm. In another aspect of the present disclosure, the maximum value of the variable h' and h" falls within the range of about 1 mm to about 200 mm.

In one aspect of the present disclosure, the intake zone 621*iii*, the transport zone 622*iii* and the discharge zone 623*iii* from FIG. 6 may be defined by distinct sets of coordinate equations.

In one aspect of the present disclosure, referring to the FIG. 1(*a*), the blades 120*a* edges of aspect a present the following constants values: $R_2''=0$, $R_1''=0$, $R_0''$ falls within the range of about 1 mm to about 100 mm, $\Theta_0''$ within the range of about 0° to about 360°(defines the starting point of the curve), $\Theta_1''$ within the ranges of about $-0.3°\cdot mm^{-1}$ to about $-90°\cdot mm^{-1}$ and within the range of about $0.3°\cdot mm^{-1}$ and about $90°\cdot mm^{-1}$, and $\Theta_2''=0$. In another aspect of the present disclosure, referring to the FIG. 13, the blades 120*a* edges of aspect a present the following constants values: $R_2''=0$, $R_1''=0$, $R_0''$ falls within the range of about 4 mm to about 60 mm, $\Theta_0''$ within the range of about 0° to about 360°(defines the starting point of the curve), $\Theta_1''$ within the ranges of about $-1°\cdot mm^{-1}$ to about $-100°\cdot mm^{-1}$ and from about $1°\cdot mm^{1}$ to about $100°\cdot mm^{-1}$, and $\Theta_2''=0$.

In another aspect of the present disclosure, referring to the FIG. 1(*a*), the blades 120*a* edges of aspect a present the following constants values: $R_2''=0$, $R_1''=0$, $R_0''$ falls within the range of about 3 mm to about 50 mm, $\Theta_0''$ within the range of about 0° to about 360°(defines the starting point of the curve), $\Theta_1''$ within the ranges of about $-5°\cdot mm^{-1}$ to about $-60°\cdot mm^{-1}$ and within the range of about $0.3°\cdot mm^{-1}$ and about $90°\cdot mm^{-1}$, and $\Theta_2''=0$. In another aspect of the present disclosure, referring to the FIG. 13, the blades 120*a* edges of aspect a present the following constants values: $R_2''=0$, $R_1''=0$, $R_0''$ falls within the range of about 4 mm to about 60 mm, $\Theta_0''$ within the range of about 0° to about 360°(defines the starting point of the curve), $\Theta_1''$ within the ranges of about $-1°\cdot mm^{-1}$ to about $-60°\cdot mm^{-1}$ and from about $1°\cdot mm^{-1}$ to about $60°\cdot mm^{-1}$, and $\Theta_2''=0$.

In yet another aspect of the present disclosure, referring to the FIG. 1(*a*), the blades 120*a* edges of aspect a present the following constants values in equations (1') and (2'), that may fall within the following ranges: $R_2'=0$, $R_1'=0$, $R_0'=5$ mm, $\Theta_0'$ taking one of the following values: {0°, 120°, 240°}, $\Theta_1'=30°$, and $\Theta_2'=0$.

Referring to FIG. 1(*a*), the blades 120*a* root of the magnetic stir bar 101*a* present different equation sets depending on the zone.

Figure 7:
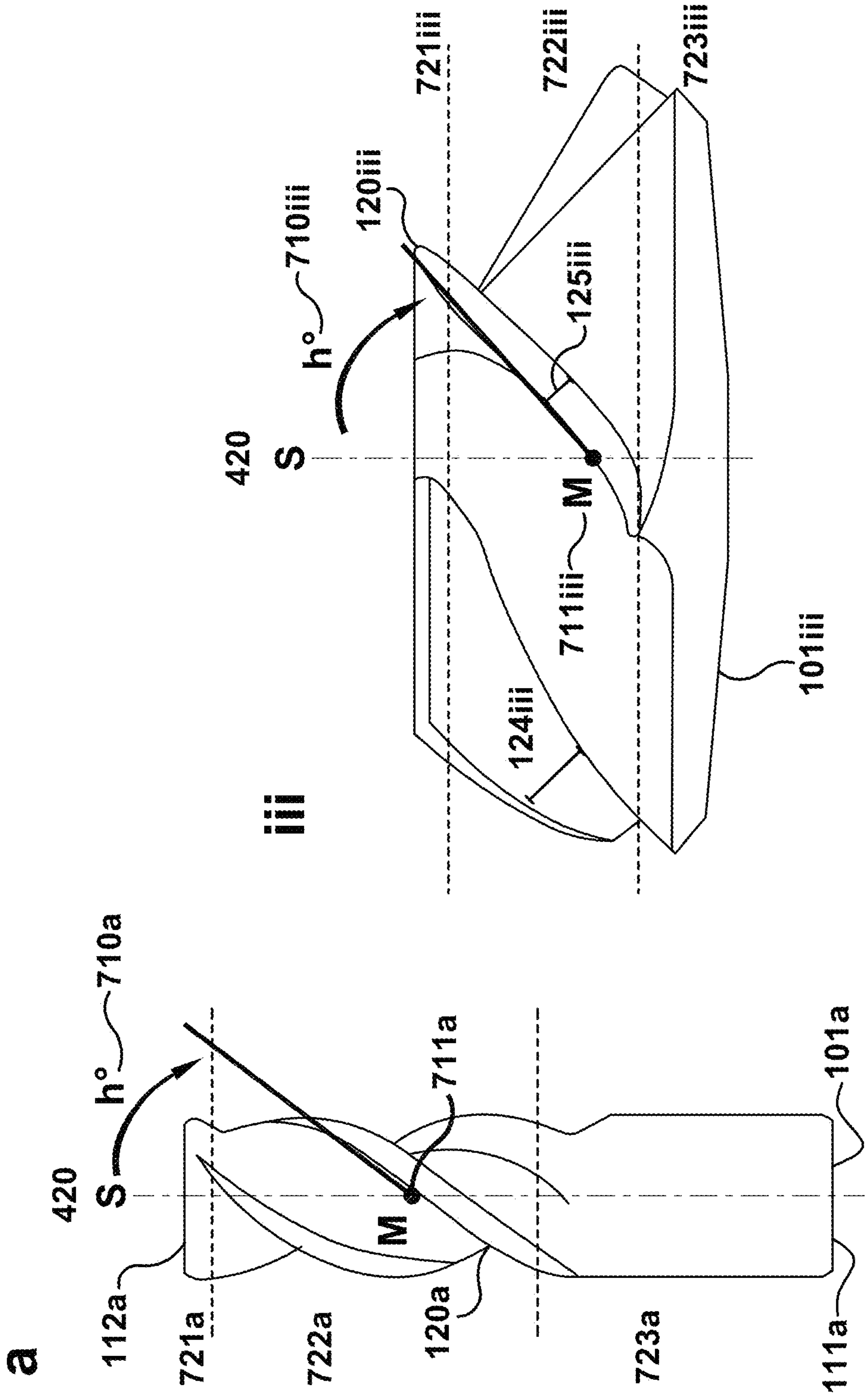
FIG. 7 is a schematic illustration of a blade's orientation angle determination in aspects a and iii.

In one aspect of the present disclosure, referring to FIG. 7, aspect a, in the discharge zone 723*a*, from about $0<h<$about 11 mm, the values of the constants in equations (1') and (2') describing the blades 120*a* root shape may fall within the following ranges: $R_2'$ within the range of about $-2\ mm^{-1}$ and about $2\ mm^{-1}$, $R_1'$ within the range of about −300 and about 300, $R_0'$ within the range of about 3 mm to about 100 mm, $\Theta_0'$ taking one of the following value: {0°, 120°, 240°}, $\Theta_1'$ within the ranges of about $-1°\cdot mm^{-1}$ and about $-90°\cdot mm^{-1}$ and of about $1°\cdot mm^{-1}$ and about $90°\cdot mm^{-1}$, and $\Theta_2'=0$.

In another aspect of the present disclosure, referring to FIG. 7, aspect a, in the discharge zone 723*a*, from about 0<h<about 11 mm, the values of the constants in equations (1') and (2') describing the blades 120*a* root shape may fall within the following ranges: $R_2'$ within the range of about $-0.5\ mm^{-1}$ and about $0.5\ mm^{-1}$, $R_1'$ within the range of about −120 and about 120, $R_0'$ within the range of about 4 mm and about 60 mm, $\Theta_0'$ taking one of the following value: {0°, 120°, 240°}, $\Theta_1'$ within the ranges of about $-5°\cdot mm^{-1}$ and about $-60°\cdot mm^{-1}$ and of about $5°\cdot mm^{-1}$ and about $60°\cdot mm^{-1}$, and $\Theta_2'=0$.

In yet another aspect of the present disclosure, referring to FIG. 7, aspect a, in the discharge zone 723*a*, from about 0<h<about 11 mm, the values of the constants in equations (1') and (2') describing the blades 120*a* root shape may be: $R_2'=0.027\ mm^{-1}$, $R_1'=-0.594$, $R_0'=4.967$ mm, $\Theta_0'$ taking one of the following value: {0°, 120°, 240°}, $\Theta_0'=30°\cdot mm^{-1}$, and $\Theta_2'=0$.

In one aspect of the present disclosure, referring to FIG. 7, aspect a, in the transport zone 722*a*, from about 11<h<about 25.5 mm, the values of the constants in equations (1') and (2') describing the blades 120*a* root shape may fall within the following ranges: $R_2'=0$, $R_1'=0$, $R_0'$ within the range of about 3 mm and about 100 mm, $\Theta_0'$ taking one of the following value: {0°, 120°, 240°}, $\Theta_1'$ within the ranges of about $-1°\cdot mm^{-1}$ and about $-90°\cdot mm^{-1}$ and of about $1°\cdot mm^{-1}$ and about $90°\cdot mm^{-1}$, and $\Theta_2'=0$.

In another aspect of the present disclosure, referring to FIG. 7, aspect a, in the transport zone 722*a*, from 11<h<25.5 mm, the values of the constants in equations (1') and (2') describing the blades 120*a* root shape may fall within the following ranges: $R_2'=0$, $R_1'=0$, $R_0'$ within the range of about 4 mm to about 60 mm, $\Theta_0'$ taking one of the following value: {0°, 120°, 240°}, $\Theta_1'$ within the ranges of about $-5°\cdot mm^{-1}$ and about $-60°\cdot mm^{-1}$ and of about $5°\cdot mm^{-1}$ and about $60°\cdot mm^{-1}$, and $\Theta_2'=0$.

In yet another aspect of the present disclosure, referring to FIG. 7, aspect a, in the transport zone 722*a*, from about 11<h<about 25.5 mm, the values of the constants in equations (1') and (2') describing the blades 120*a* root shape may fall within the following ranges: $R_2'=0$, $R_1'=0$, $R_0'=1.7$ mm, $\Theta_0'$ taking one of the following values: {0°, 120°, 240°}, $\Theta_1'=30°$, and Θ2'=0.

In one aspect of the present disclosure, referring to FIG. 7, aspect a, in the intake zone 721*a*, from about 25.5 mm<h<about 36.5 mm, the values of the constants in equations (1') and (2') describing the blades 120*a* root shape may fall within the following ranges: $R_2'$ within the range of about $-2\ mm^{-1}$ and about $2\ mm^{-1}$, $R_1'$ within the range of about −300 and about 300, $R_0'$ within the range of about 3 mm and about 100 mm, $\Theta_0'$ taking one of the following value: {0°, 120°, 240°}, $\Theta_1'$ within the ranges of about $-1°\cdot mm^{-1}$ and about $-90°\cdot mm^{-1}$ and of about $1°\cdot mm^{-1}$ and about $90°\cdot mm^{-1}$, and $\Theta_2'=0$.

In another aspect of the present disclosure, referring to FIG. 7, aspect a, in the intake zone 721*a*, from about 25.5 mm<h<about 36.5 mm, the values of the constants in equations (1') and (2') describing the blades 120*a* root shape may fall within the following ranges: $R_2'$ within the range of about $-0.5\ mm^{-1}$ and about $0.5\ mm^{-1}$, $R_1'$ within the range of about −120 and about 120, $R_0'$ within the range of about 4 mm and about 60 mm, $\Theta_0'$ taking one of the following value: {0°, 120°, 240°}, 01' within the ranges of about $-5°\cdot mm^{-1}$ and about $-60°\cdot mm^{-1}$ and of about $5°\cdot mm^{-1}$ and about $60°\cdot mm^{-1}$, and $\Theta_2'=0$.

In yet another aspect of the present disclosure, referring to FIG. 7, aspect a, in the intake zone 721*a*, from about 25.5 mm<h<about 36.5 mm, the values of the constants in equations (1') and (2') describing the blades 120*a* root shape may fall within the following ranges: $R_2'=0.027\ mm^{-1}$, $R_1'=-1.377$, $R_0'=19.26$ mm, $\Theta_0'$ taking one of the following value: {0°, 120°, 240°}, $\Theta_1'=30°$, and $\Theta_2'=0$.

In one aspect of the present disclosure, referring to the FIG. 13, the values of the constants in equations (1") and (2") with respect to the blades 120*iii* edges of aspect iii may fall within the following ranges: $R_2''=0$, $R_1''$ within the range of $-110\ mm^{-1}$ and $110\ mm^{-1}$, $R_0''$ within the range of about 3 mm and about 120 mm, $\Theta_0''$ within the range of about 0° and about 3600 (defines the starting point of the curve), $\Theta_1''$ within the ranges of about $-0.5°\cdot mm^{-1}$ and—about $60°\cdot mm^{-1}$ and of about $0.5°\cdot mm^{-1}$ and about $60°\cdot mm^{-1}$, and $\Theta_2''=0$.

In another aspect of the present disclosure, referring to the FIG. 13, the values of the constants in equations (1") and (2") with respect to the blades 120*iii* edges of aspect iii may fall within the following ranges: $R_2''=0$, $R_1''$ within the range of about $-60\ mm^{-1}$ and about $60\ mm^{-1}$, $R_0''$ within the range of about 4 mm and about 60 mm, $\Theta_0''$ within the range of about 0° and about 3600 (defines the starting point of the curve), $\Theta_1''$ within the ranges of about $-1°\cdot mm^{1}$ and about $-30°\cdot mm^{-1}$ and of about $1°\cdot mm^{-1}$ and about $30°\cdot mm^{-1}$, and $\Theta_2''=0$.

In yet another aspect of the present disclosure, referring to the FIG. 13, the values of the constants in equations (1") and (2") with respect to the blades 120*iii* edges of aspect iii may fall within the following ranges: $R_2''=0$, $R_1''=0.56$, $R_0''=21.7$ mm, $\Theta_0''$ within the range of about 0° and about 3600 (defines the starting point of the curve), $\Theta_1''=2.4°\cdot mm^{-1}$, and $\Theta_2''=0$.

In one aspect of the present disclosure, referring to the FIG. 13, the values of the constants in equations (1') and (2') with respect to the blades 120*iii* root of aspect iii may fall within the following ranges: $R_2'$ within the range of about $-10\ mm^{-1}$ and about $10\ mm^{-1}$, $R_1'$ within the range of about −100 and about 100, $R_0'$ within the range of about 3 mm and about 100 mm, $\Theta_0'$ within the range of about 0° and about 3600 (defines the starting point of the curve), $\Theta_1'$ within the ranges of about $-0.5°\cdot mm^{-1}$ and about $-60°\cdot mm^{-1}$ and of about $0.5°\cdot mm^{-1}$ and about $60°\cdot mm^{-1}$, and $\Theta_2'=0$.

In another aspect of the present disclosure, referring to the FIG. 13, the values of the constants in equations (1') and (2') with respect to the blades 120*iii* root of aspect iii may fall within the following ranges: $R_2'$ within the range of about $-2\ mm^{-1}$ and about $2\ mm^{-1}$, $R_1'$ within the range of about −60 and about 60, $R_0'$ within the range of about 4 mm to about 60 mm, $\Theta_0'$ within the range of about 0° and about 3600 (defines the starting point of the curve), $\Theta_1'$ within the ranges of about $-1°\cdot mm^{-1}$ and about $-30°\cdot mm^{-1}$ and of about $1°\cdot mm^{1}$ and about $30°\cdot mm^{-1}$, and $\Theta_2'=0$.

In yet another aspect of the present disclosure, referring to the FIG. 13, the values of the constants in equations (1') and (2') with respect to the blades 120*iii* root of aspect iii may fall within the following ranges: $R_2'=0.01$, $R_1'=-1.2$, $R_0'=17.5$ mm, $\Theta_0'$ within the range of about 0° and about 360°(defines the starting point of the curve), $\Theta_1'=2.4°\cdot mm^{-1}$, and $\Theta_2'=0$.

Referring to FIG. 6*ii*, in the aspect ii of the present disclosure, the intake zone 621*ii* and the transport zone 622*ii* share the same constant in the equations (1'), (1"), (2'), and (2"), for the blades' 120*ii* edges and roots. In this aspect, the discharge zone 623*ii* has its own set of constants.

In one aspect of the present disclosure, referring to FIG. 6*ii*, in the intake zone 621*ii* and the transport zone 622*ii*, from about 0<h<about 13.7 mm, the values of the constants in equations (1") and (2") with respect to the blades 120*ii* edges of aspect ii may fall within the following ranges: $R_2''$ within the range of about $-10\ \text{mm}^{-1}$ and about $10\ \text{mm}^{-1}$, $R_1''$ within the range of about $-300$ and about 300, $R_0''$ within the range of about $-20$ mm to about 200 mm, $\Theta_0''$ within the range of about 0 and about 360°, $\Theta_1''$ within the ranges of about $-1°\cdot\text{mm}^{-1}$ to about $-200°\cdot\text{mm}^{-1}$ and of about $1°\cdot\text{mm}^{1}$ to about $200°\cdot\text{mm}^{-1}$, and $\Theta_2''=0$.

In another aspect of the present disclosure, referring to FIG. 6*ii*, in the intake zone 621*ii* and the transport zone 622*ii*, from about 0<h<about 13.7 mm, the values of the constants in equations (1") and (2") with respect to the blades 120*ii* edges of aspect ii may fall within the following ranges: $R_2''$ within the range of about $-5\ \text{mm}^{-1}$ and about $5\ \text{mm}^{-1}$, $R_1''$ within the range of about $-150$ and about 150, $R_0''$ within the range of about 3 mm to about 150 mm, $\Theta_0''$ within the range of about 0 and about 360°, $\Theta_1''$ within the ranges of about $-10°\cdot\text{mm}^{-1}$ to about $-100°\cdot\text{mm}^{-1}$ and of about $10°\cdot\text{mm}^{-1}$ to about $100°\cdot\text{mm}^{-1}$ and $\Theta_2''=0$.

In yet another aspect of the present disclosure, referring to FIG. 6*ii* aspect a, in the intake zone 621*ii* and the transport zone 622*ii*, from about 0<h<about 13.7 mm, the values of the constants in equations (1") and (2") with respect to the blades 120*ii* edges of aspect ii may be: $R_2''=-0.06\ \text{mm}^{-1}$, $R_1''=0.72$, $R_0''=11.84$ mm, $\Theta_0''$taking one of the following value: {0°, 120°, 240°}, $\Theta_1''=7.4687°\cdot\text{mm}^{-1}$, and $\Theta_2''=0$.

In one aspect of the present disclosure, referring to FIG. 6*ii*, in the discharge zone 623*ii*, from about 13.7<h<about 19.5 mm, the values of the constants in equations (1") and (2") with respect to the blades 120*ii* edges of aspect ii may fall within the following ranges: $R_2''$ within the range of about $-10\ \text{mm}^{-1}$ and about $10\ \text{mm}^{-1}$, $R_1''$ within the range of about $-300$ and about 300, $R_0''$ within the range of about 1 mm to about 200 mm, $\Theta_0''$ within the range of about 0 and about 360°, $\Theta_1''$ within the ranges of about $-1°\cdot\text{mm}^{-1}$ to about $-200°\cdot\text{mm}^{-1}$ and of about $1°\cdot\text{mm}^{1}$ to about $200°\cdot\text{mm}^{-1}$, and $\Theta_2''$ within the ranges of about $-10°\cdot\text{mm}^{-2}$ to about $10°\cdot\text{mm}^{2}$.

In another aspect of the present disclosure, referring to FIG. 6*ii*, in the discharge zone 623*ii*, from about 13.7<h<about 19.5 mm, the values of the constants in equations (1") and (2") with respect to the blades 120*ii* edges of aspect ii may fall within the following ranges: $R_2''$ within the range of about $-5\ \text{mm}^{-1}$ and about $5\ \text{mm}^{-1}$, $R_1''$ within the range of about $-150$ and about 150, $R_0''$ within the range of about 3 mm to about 150 mm, $\Theta_0''$ within the range of about 0 and about 360°, $\Theta_1''$ within the ranges of about $-10°\cdot\text{mm}^{-1}$ to about $-100°\cdot\text{mm}^{-1}$ and of about $10°\cdot\text{mm}^{-1}$ to about $100°\cdot\text{mm}^{-1}$ and $\Theta_2''$ within the ranges of about $-5°\cdot\text{mm}^{-2}$ to about $5°\cdot\text{mm}^{-2}$.

In yet another aspect of the present disclosure, referring to FIG. 6*ii*, in the discharge zone 623*ii*, from about 13.7<h<about 19.5 mm, the values of the constants in equations (1") and (2") with respect to the blades 120*ii* edges of aspect ii may be: $R_2''=-0.06\ \text{mm}^{-1}$, $R_1''=0.72$, $R_0''=11.84$ mm, $\Theta_0''$taking one of the following values: {40.2°, 160.2°, 280.2°}, $\Theta_1''=-51.033°\cdot\text{mm}^{-1}$, and $\Theta_2''=2.138°\cdot\text{mm}^{2}$.

In one aspect of the present disclosure, referring to FIG. 6*ii*, in the intake zone 621*ii* and the transport zone 622*ii*, from about 0<h<about 13.7 mm, the values of the constants in equations (1') and (2') with respect to the blades 120*ii* root of aspect ii may fall within the following ranges: $R_2'$ within the range of about $-10\ \text{mm}^{-1}$ and about $10\ \text{mm}^{-1}$, $R_1'$ within the range of about $-300$ and about 300, $R_0'$ within the range of about 0.4 mm to about 150 mm, $\Theta_0'$ within the range of about 0 and about 360°, $\Theta_1'$ within the ranges of about $-1°\cdot\text{mm}^{-1}$ to about $-200°\cdot\text{mm}^{-1}$ and of about $1°\cdot\text{mm}^{-1}$ to about $200°\cdot\text{mm}^{-1}$, and $\Theta_2'=0$.

In another aspect of the present disclosure, referring to FIG. 6*ii*, in the intake zone 621*ii* and the transport zone 622*ii*, from about 0<h<about 13.7 mm, the values of the constants in equations (1') and (2') with respect to the blades 120*ii* root of aspect ii may fall within the following ranges: $R_2'$ within the range of about $-5\ \text{mm}^{-1}$ and about $5\ \text{mm}^{-1}$, $R_1'$ within the range of about $-150$ and about 150, $R_0'$ within the range of about 1 mm to about 110 mm, $\Theta_0'$ within the range of about 0 to about 360°, $\Theta_1'$ within the ranges of about $-10°\cdot\text{mm}^{-1}$ to about $-100°\cdot\text{mm}^{-1}$ and of about $10°\cdot\text{mm}^{-1}$ to about $100°\cdot\text{mm}^{-1}$ and $\Theta_2'=0$.

In yet another aspect of the present disclosure, referring to FIG. 6*ii*, in the intake zone 621*ii* and the transport zone 622*ii*, from about 0<h<about 13.7 mm, the values of the constants in equations (1') and (2') with respect to the blades 120*ii* root of aspect ii may be: $R_2'=-0.00884\ \text{mm}^{-1}$, $R_1'=0$, $R_0'=6.275$ mm, $\Theta_0'$ taking one of the following value: {0°, 120°, 240°}, $\Theta_1'=7.4687°\cdot\text{mm}^{-1}$, and $\Theta_2'=0$.

In one aspect of the present disclosure, referring to FIG. 6*ii*, in the discharge zone 623*ii*, from about 13.7<h<about 19.5 mm, the values of the constants in equations (1') and (2') with respect to the blades 120*ii* root of aspect ii may fall within the following ranges: $R_2'$ within the range of about $-10\ \text{mm}^{-1}$ and about $10\ \text{mm}^{-1}$, $R_1'$ within the range of about $-300$ and about 300, $R_0'$ within the range of about 0.4 mm to about 150 mm, Θ0' within the range of about 0 and about 360°, $\Theta_1'$ within the ranges of about $-1°\cdot\text{mm}^{-1}$ to about $-200°\cdot\text{mm}^{-1}$ and of about $1°\cdot\text{mm}^{1}$ to about $200°\cdot\text{mm}^{-1}$, and $\Theta_2'$ within the ranges of about $-10°\cdot\text{mm}^{-2}$ to about $10°\cdot\text{mm}^{2}$.

In another aspect of the present disclosure, referring to FIG. 6*ii*, in the discharge zone 623*ii*, from about 13.7<h<about 19.5 mm, the values of the constants in equations (1') and (2') with respect to the blades 120*ii* root of aspect ii may fall within the following ranges: $R_2'$ within the range of about $-5\ \text{mm}^{-1}$ and about $5\ \text{mm}^{-1}$, $R_1'$ within the range of about $-150$ and about 150, $R_0'$ within the range of about 1 mm to about 110 mm, $\Theta_0'$ within the range of about 0 and about 360°, $\Theta_1'$ within the ranges of about $-10°\cdot\text{mm}^{-1}$ to about $-100°\cdot\text{mm}^{-1}$ and of about $10°\cdot\text{mm}^{-1}$ to about $100°\cdot\text{mm}^{-1}$ and $\Theta_2'$ within the ranges of about $-5°\cdot\text{mm}^{-2}$ to about $5°\cdot\text{mm}^{-2}$.

In yet another aspect of the present disclosure, referring to FIG. 6*ii*, in the discharge zone 623*ii*, from about 13.7<h<about 19.5 mm, the values of the constants in equations (1') and (2') with respect to the blades 120*ii* root of aspect ii may be: $R_2'=-0.00884\ \text{mm}^{-1}$, $R_1'=0$, $R_0'=6.275$ mm, $\Theta_0'$ taking one of the following values: {40.2°, 160.2°, 280.2°}, $\Theta_1'=-51.033°\cdot\text{mm}^{-1}$, and $\Theta_2'=2.138°\cdot\text{mm}^{2}$.

In one aspect of the present disclosure, with respect to FIG. 7, the fluid dynamics are governed by the specific characteristics of each blade 120*iii*, including its length 124*iii*, thickness 125*iii*, and its edge helix angle (h°) 710*iii*. The helix angle (h°) 710*iii* is defined by the angle between a helix and an axial line on its right circular cylinder or cone. In the context of the present disclosure, referring FIG. 7, aspect iii, the helix angle (h°) 710*iii* at the point (M) 711*iii* of the blade's 120*iii* edge refers to the angle at the point (M) 711*iii*, between the curve formed by the edge of the blade 120*iii* and the stirring axis (S) 420 of the magnetic stir bar 101*iii* on its right circular cylinder. In one aspect of the present disclosure, this helix angle (h°) 710*iii* is measured from the magnetic stir bar's 101*iii* spinning axis, consequently a left-handed blade 120*iii* has an angle ranging between about 0° to about 90° while a right-handed blade 120*iii* has an angle ranging between about −0° to about −90°.

In one aspect of the present disclosure, the helix angles (h°) 710*iii* of the edge of its oriented blade 120*iii* may exhibit an either fixed or variable profile, configured to fall within the ranges of about 10° to about 89° or about −10° to about −89°. In another aspect of the present disclosure, the helix angles (h°) 710*iii* of the edge of its oriented blade 120*iii* fall within the ranges of about 15° to about 88° or about −15° to about −88°.

Referring to the FIG. 7, bidirectional aspect a is characterized by a constant helix angle (h°) 710*a* of the blade 120*a* across the three zones. The helix angle (h°) 710*a* is defined by the angle between a helix and an axial line on its right circular cylinder or cone. In the context of the present disclosure, referring FIG. 7, aspect a, the helix angle (h°) 710*a* at the point (M) 711*a* of the blade's 120*a* edge refers to the angle at the point (M) 711*a*, between the curve formed by the edge of the blade 120*a* and the stirring axis (S) 420 of the magnetic stir bar 101*a* on its right circular cylinder. In one aspect of the present disclosure, this constant helix angle (h°) 710*a* ranges from about 10° to about 90° or from about −10° to about −90°. In another aspect of the present disclosure, this constant helix angle (h°) 710*a* ranges from about 25° to about 65° or from about −25° to about −65°. The defining feature of aspect a is that the constant helix angle (h°) 710*a* yields similar flow paths regardless of the rotational direction. The intake and discharge zones function interchangeably depending on the direction of rotation. Consequently, whether operating in a down-pumping or up-pumping mode, the fluid follows the same path through the device, merely in reverse order.

Referring to the FIG. 7, aspect a incorporates a variable helix angle (h°) 710*a* configuration of the blades 120*a*, effectively mimicking two distinct flow paths within a single device. The intake zone 721*a* and the discharge zone 723*a* interchange roles based on the direction of rotation; in up-pumping mode, intake zone 721*a* functions as the intake, while in down-pumping mode, it serves as the discharge, with discharge zone 723*a* assuming the opposite role in each case. This flow path passes through the transport zone 722*a* in both cases. In one aspect of the present disclosure, the helix angle (h°) 710*a* of the blade in the intake zone 721*a* falls within the ranges of about 0° to about 90° or about −0° to about −90°. In another aspect of the present disclosure, the helix angle (h°) 710*a* of the blade in the intake zone 721*a* falls within the ranges of about 10° to about 70° or about −10° to about −70°. In yet another aspect of the present disclosure, the helix angle (h°) 710*a* of the blade in the intake zone 721*a* falls within the ranges of about 15° to about 650 or about −15° to about −65°. In one aspect of the present disclosure, the helix angle (h°) 710*a* of the oriented blade 120*a* in the discharge zone 723*a* falls within the ranges of about 0° to about 900 or about −0° to about −90°. In another aspect of the present disclosure, the helix angle (h°) 710*a* of the oriented blade 120*a* in the discharge zone 723*a* falls within the ranges of about 200 to about 800 or about −20° to about −80°. In yet another aspect of the present disclosure, the helix angle (h°) 710*a* of the oriented blade 120*a* in the discharge zone 723*a* falls within the ranges of about 300 to about 700 or about −30° to about −70°. The transport zone 722*a* displays a relatively constant helix angle to convey the liquid. In one aspect of the present disclosure, the helix angle (h°) 710*a* of the blade 120*a* in the transport zone 722*a* falls within the ranges of about 0° to about 900 or about −0° to about −90°. In another aspect of the present disclosure, the helix angle (h°) 710*a* of the blade 120*a* in the transport zone 722*a* falls within the ranges of about 150 to about 750 or about −15° to about −75°. In yet another aspect of the present disclosure, the helix angle (h°) 710*a* of the blade 120*a* in the transport zone 722*a* falls within the ranges of about 250 to about 650 or about −25° to about −65°. This dual-nature design expands the operational versatility of the magnetic stir bar 101*a*, allowing it to efficiently handle a wider range of fluid viscosity and application.

Referring to the FIG. 7, aspect iii presents a mono-directional design optimized for generating a downward flow in a variable blade's 120*iii* helix angle (h°) 710*iii* configuration. In one aspect of the present disclosure, in the intake zone 721*iii*, positioned at the top of the device, the blades 120*iii* feature a relatively low helix angle (h°) 710*iii*. This configuration generates a low-pressure area during rotation, facilitating efficient fluid intake. In one aspect of the present disclosure, the helix angle (h°) 710*iii* in this intake zone 721*iii* ranges from about 20° to about 70° or about −20° to about −70°. In another aspect of the present disclosure, the helix angle (h°) 710*iii* in this intake zone 721*iii* ranges from about 30° to about 60° or about −30° to about −60°. The transportation zone 722*iii* displays a continuous increase of the blade's helix angle (h°) 710*iii*, accelerating of the fluid within the flow path. In one aspect of the present disclosure, the helix angle (h°) 710*iii* of the blade 120*iii* in the transport zone 722*iii* falls within the ranges of about 25° to about 80° or about −25° to about −80°. In another aspect of the present disclosure, the helix angle (h°) 710*iii* of the blade 120*iii* in the transport zone 722*iii* falls within the ranges of about 37° to about 70° or about −37° to about −70°. At the discharge zone 723*iii*, the helix angle (h°) 710*iii* of the blades 120*iii* is designed with the highest helix angle (h°) 710*iii* to provide the most efficient direction to the liquid during discharge. In one aspect of the present disclosure, the helix angle (h°) 710*iii* of the blade 120*iii* in the discharge zone 723*iii* falls within the ranges of about 35° to about 89° or about −35° to about −89°. In another aspect of the present disclosure, the helix angle (h°) 710*iii* of the blade 120*iii* in the discharge zone 723*iii* falls within the ranges of about 45° to about 88° or about −45° to about −88°. This graduated increase in helix angle (h°) 710*iii* from the intake zone 721*iii* to the discharge zone 723*iii* creates a high-shear stress type magnetic stir bar 101*iii*.

Figure 8:
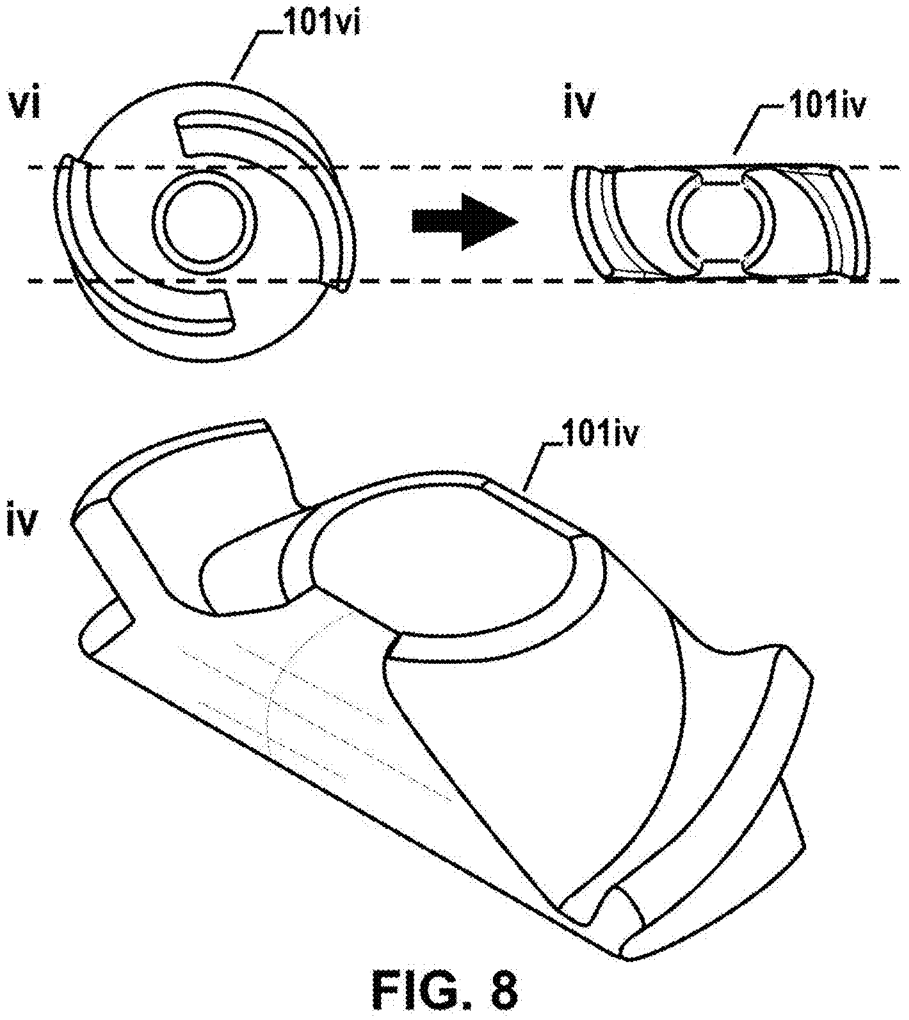
FIG. 8 is an illustration of the transformation of aspect vi to aspect iv through profile truncation.

FIG. 8 depicts the structural modification of the magnetic stir bar 101*vi* showcased as aspect vi undertaken to create the magnetic stir bar 101*iv* showcased in aspect iv in FIG. 1(*b*) of the present disclosure. This structural modification is specifically designed to enable the insertion of the magnetic stir bar 101*iv* through restricted apertures, commonly found in laboratory glassware. The body of the magnetic stir bar 101*iv* is altered by a profiled truncation, the contour of which allows for a stable behavior during usage. With reference to the plane of the spinning axis of the magnetic stir bar 101*iv*, in one aspect of the present disclosure, the truncation is symmetrical to guarantee a stable behavior of the magnetic stir bar 101*iv* during its rotation. In another aspect of the present disclosure, the truncation of the magnetic stir bar 101*iv* is asymmetrical. In one aspect of the present disclosure, depending on the shape of the vessel bottom, this truncation profile can be a triangular, rectangular, trapezoidal or any other rectilinear shape, circular, ovoidal, elliptical, or any other rounded shape or a composition of both rectilinear and rounded shape. In another aspect of the present disclosure, the truncation profiles are rectangular, trapezoidal, or a combination of both rectilinear and rounded shapes. In one aspect of the present disclosure, the overall height and width of this profile are within the range of about 1 mm to about 120 mm. In another aspect of the present disclosure, the overall height and width of this profile are within the range of about 2 mm to about 80 mm. In one aspect of the present disclosure, the magnetic stir bar 101*iii* of aspect iii and the magnetic stir bar 101*vi* of aspect vi are equivalent to one another.

The flow movement of a few aspects of the present disclosure have been analyzed using CFD, a specialized area of fluid mechanics, which utilizes numerical methods and algorithms to analyze and solve fluid flow problems. By leveraging computational resources, CFD simulations provide comprehensive insights into fluid behavior across various conditions, encompassing both laminar and turbulent flows. This technology optimizes design parameters and improves overall performance, making it a useful tool in the development and refinement of fluid-related systems and components.

FIG. 9 displays the streamline plots of the two-dimensional cross-section plane on the Y-Z plane in the Cartesian coordinate system, illustrating both the prior art and aspects of the present disclosure. Streamlines are a set of curves whose tangent vectors constitute the velocity vector field of a flow and represent the trajectory that a fluid particle would take if the flow were in steady state. Streamlines can be used for visualizing and analyzing fluid flow patterns within a computational domain. The streamline plots in FIGS. 9(*a*), 9(*b*), 9(*c*), and 9(*d*) simulate a magnetic stir bar in a cylindrical domain, akin to a flat-bottomed vessel containing water with a viscosity of 1 cP. FIG. 9(*e*) simulates a magnetic stir bar in a vial-like domain containing water with a viscosity of 1 cP; and FIGS. 9(*f*) and 9(*g*) simulate a magnetic stir bar in a round-bottom flask-like domain containing water with a viscosity of 1 cP. The CFD simulation of the these aspects of the present disclosure can be divided into two types: the CFD simulation when the rotational axis (P) 430 of the magnetic stir bar and the stirring axis (S) 420 of the magnetic stir plate are aligned, as shown in FIGS. 9(*a*), 9(*b*), 9(*c*), and 9(*d*), and the CFD simulation when the rotational axis (P) 430 of the magnetic stir bar is tilted compared to the stirring axis (S) 420 of the magnetic stir plate, as shown in FIGS. 9(*e*), 9(*f*), and 9(*g*).

Referring to FIG. 9(*a*), a streamline plot illustrates the fluid dynamics generated by a conventional rod-shaped magnetic stir bar in a flat-bottom vessel under typical operating conditions. In this aspect of the present disclosure, the conventional rod-shaped magnetic stir bar has a diameter and height of 44 mm and 8 mm, respectively, while the flat bottom vessel has a diameter and height of 120 mm and 120 mm, respectively. Upon rotational motion of the conventional rod-shaped magnetic stir bar, a primary vortex flow pattern is established. This pattern is characterized by radial flow outward to the edges of the vessel then rise upward along the container walls, and a central downward axial flow resulting from the developed pressure gradient, forming a continuous circulation loop within the container. While this vortex-dominated flow provides some degree of mixing, it exhibits limitations, particularly at high liquid levels close to the surface of the fluid. The mixing primarily takes place in close proximity to the two extremities of the conventional rod-shaped magnetic stir bar. These inherent flow characteristics lead to sub-optimal mixing performance, which becomes particularly pronounced in applications involving high-viscosity fluids, larger volume vessels, or when uniform mixing throughout the entire fluid body is critical. This emphasizes the limitations of conventional magnetic stir bar designs.

Referring to FIG. 9(*b*), 9(*c*), the magnetic stir bar 101*ii* from FIG. 1(*b*), aspect ii is deployed in the same dimension of the liquid domain as FIG. 9(*a*), simulating typical use of the magnetic stir bar 101*ii* in a flat bottom vessel. In this aspect of the present disclosure, the magnetic stir bar 101*ii* has a diameter and a height of 30 mm and 20 mm, respectively, while the flat bottom vessel has a diameter and a height of 120 mm and 120 mm, respectively. In this aspect of the present disclosure, the magnetic stir bar 101*ii* exhibits two modes of operation: an up-pumping mode achieved through a combination of right-handedness 501 and clockwise rotation, resulting in an upward fluid flow; and a down-pumping mode achieved through a combination of right-handedness 501 and counterclockwise rotation, resulting in a downward fluid flow. In the up-pumping mode, the flow originates from the head 111*ii* and is directed diagonally upward by the blade 120*ii*, subsequent upward flow along the vessel wall, and the development of a pressure gradient driving fluid towards the central axis and back to the tail 112*ii*. This pressure gradient drives the fluid from areas of higher pressure back towards the lower-pressure center. The oriented blade 120*ii* exerts a higher pressure on the fluid at the same rotational speed compared to a conventional rod, resulting in the adjacent flow layer to propagate further. In a high-viscosity environment (viscosity=1, 183 cP), CFD analysis calculated that the pumping capacity in aspect ii is 1.6 times higher than that of a conventional rod-shaped magnetic stir bar of comparable dimensions. This improved efficiency is attributed to the liquid or particles being directly lifted by the blade 120*ii* of aspect ii, which minimizes energy loss during the transfer of kinematic energy from the device to the fluid. Conversely, a conventional rod-shaped magnetic stir bar generates a radial flow that pushes the liquid towards the edges of the vessel and then travels upward along the vessel wall. This flow path consumes energy and reduces the pumping capacity. In the down-pumping mode, the device operates on similar principles but with a reversed flow direction, creating a distinct and efficient mixing pattern. The flow originates from the head 111*ii* and is forcefully directed diagonally downward by the blade 120*ii*, effectively pumping the fluid directly towards the bottom of the vessel. Upon impact with the bottom surface, the fluid experiences a rapid change in direction. This collision induces a strong vertical component to the flow, causing the fluid to rebound upwards along the vessel walls. The direct impact and subsequent upward deflection create localized regions of high pressure near the bottom and walls of the vessel. As the fluid ascends, it encounters decreasing pressure gradients. This pressure differential drives the fluid inward, towards the center of the vessel where the pressure is lower due to the spinning action of the magnetic stir bar 101*ii*. The high-energy input from the direct downward pumping, combined with the strong vertical rebounding effect, results in enhanced turbulence and shear throughout the fluid volume. This intensified mixing action is particularly effective in promoting suspension of particles.

The magnetic stir bar 101*iii* from FIG. 1(*b*), aspect iii, is deployed, shown in FIG. 9(*d*), relating to a permutation of aspect ii. The blade 120*iii* has been altered to increase shear and fitted to be deployed in a flat bottom vessel. In this aspect of the present disclosure, the magnetic stir bar 101*iii* has a diameter and height of 40 mm and 16 mm, respectively, while the simulated dimension has a diameter and height of 120 mm and 120 mm, respectively. In this CFD analysis, the magnetic stir bar 101*iii* features right-handedness 501 coupled with a counterclockwise rotational direction, which generates a distinctive down-pumping flow pattern. The distinguishing feature of the magnetic stir bar 101*iii* is the modified blade 120*iii* that increases liquid shear and modified core 110*iii* into a cone-shape to create a greater pressure gradient within the fluid volume compared to the magnetic stir bar 101*ii*. Quantitative performance analysis demonstrates that under equivalent operational parameters, the magnetic stir bar 101*iii* achieves shear rates approximately 2.7 times greater than those produced by conventional rod-shaped magnetic stir bars of comparable dimensions. In one aspect of the present disclosure, the magnetic stir bar 101*iii* is suitable for emulsion applications, enabling the production of fine, homogeneous emulsification that were previously unattainable with conventional magnetic rod-shaped stir bars.

Referring to FIG. 9(*e*), the magnetic stir bar 101*v* from FIG. 1(*b*), aspect v, may be used in cylindrical vessels with small diameters in one aspect of the present disclosure, such as vials or test tubes, and may be used for parallel synthesis applications in another aspect of the present disclosure. In one aspect of the present disclosure, the magnetic stir bar 101*v* features a lay-down configuration, including a head lily that functions as a pivot point at the vessel bottom, and a tail 112*v* designed to contact the vessel wall. In one aspect of the present disclosure, the magnetic stir bar 101*v* has a diameter and height of 4.5 mm and 25 mm, respectively. In one aspect of the present disclosure, the dimension used to perform the simulation is the size of a typical vial with a diameter and height of 14.6 mm and 33 mm, respectively. In this CFD analysis, the magnetic stir bar 101*v* is in down-pump mode and the streamline plot reveals a complex flow regime characterized by fluid movement from the head 111*v*, circulation around the core 110*v*, and downward propagation towards the tail 112*v*. In one aspect of the present disclosure, the magnetic stir bar 101*v* showcases a double axis rotational movement, or torque-induced precession, which increases turbulent kinetic energy, vorticity, and turbulent flow. The quantitative performance analysis showcased in FIG. 9(*e*) demonstrates that the magnetic stir bar 101*v* achieved a vorticity level approximately 42.9 times greater than those produced by conventional rod-shaped magnetic stir bars. This improvement in rotational fluid motion correlates directly to enhanced turbulence, and superior dispersion of particles or solutes within the fluid. The present disclosure thus describes an advancement in small-scale fluid mixing technology for applications requiring high efficiency in confined spaces.

Referring to FIG. 9(*f*), the magnetic stir bar 101*i*, as shown in FIG. 1(*b*), aspect i, is tailored for, but not restricted to, operation in a round-bottom flask. In one aspect of the present disclosure, the magnetic stir bar 101*i* has a diameter and height of 8 mm and 45 mm, respectively, while the round bottom flask has a diameter of 96 mm. The magnetic stir bar 101*i* can be operated in a right-handed configuration 501 with clockwise rotation to generate an up-pumping flow, or with counterclockwise rotation to induce a down-pumping flow. CFD analysis reveals a critical permutation of magnetic stir bar 101*i*: the flow path is non-vertical to the stirring axis (S) 420 of the stir plate. This non-alignment prevents the formation of a singular vortex, resulting in a completely non-vortex flow pattern at any level of fluid. Despite the absence of a central vortex, the flow remains highly turbulent with high fluid velocities. The arrangement of the magnetic stir bar 101*i* showcases a further design adaptation of lay-down configuration where torque-induced precession takes place. The result is increased turbulent kinetic energy and intensified chaotic flow patterns to promote heat and mass transfer within the vessel.

In one aspect of the present disclosure, with respect to FIG. 1(*a*), aspect a, FIG. 1(*b*), aspects i, ii, iii, iv, and v, and FIG. 8, aspect vi, the magnetic stir bars 101*a*, 101*i*, 101*ii*, 101*iii*, 101*iv*, 101*v*, and 101*vi* may act as impellers in small-scale laboratory settings.

In one aspect of the present disclosure, the cores 110*a*, 11$\Theta_0$, 110*ii*, 110*iii*, 110*iv*, 110*v*, and 110*vi* and the blades 120*a*, 12$\Theta_0$, 120*ii*, 120*iii*, 120*iv*, 120*v*, and 120*vi* of the magnetic stir bars 101*a*, 101*i*, 101*ii*, 101*iii*, 101*iv*, 101*v*, and 101*vi* respectively are constructed from solvent-resistant materials to prevent contamination and ensure safety and reliability. Suitable materials for this purpose include, but are not limited to, metals and alloys such as stainless steel and titanium, ceramics such as borosilicate glass and alumina, and engineering-grade polymers. Examples of these polymers include: polytetrafluoroethylene (PTFE), polyetheretherketone (PEEK), polyetherketoneketone (PEKK), polyaryletherketone (PAEK), polyetherketone (PEK), polyetherimide (PEI), polyamide (PA), polyacetal (POM), polyphenylene sulfide (PPS), polysulfone (PSU), polyphenylsulfone (PPSU), polypropylene (PP), high-density polyethylene (HDPE), ultra-high molecular weight polyethylene (UHMWPE), cellulose, polyethylene terephthalate (PET), polybutylene terephthalate (PBT), polyethylene naphthalate (PEN), polybutylene naphthalate (PBN), and polyphenylene oxide (PPO).

In one aspect of the present disclosure, the magnet material provides sufficient magnetic flux density to meet the torque requirements and ensure reliability. Suitable materials include, but are not limited to, ferrite magnets composed of iron (Fe) oxide and either strontium carbonate ($SrCO_3$) or barium carbonate ($BaCO_3$); AlNiCo magnets, which are alloys of aluminum (Al), nickel (Ni), and cobalt (Co); and rare-earth magnets, which are alloys of neodymium (Nd), iron (Fe), samarium (Sm), and boron (B). In one aspect of the present disclosure, the magnet 130*a* includes permanent magnets selected from the group consisting of SmCo grades 18-32 and AlNiCo grades 5-9, due to their superior magnetic properties and temperature stability at elevated temperatures. In other aspects of the present disclosure containing multiple magnets, the magnets may be composed of the same or different materials.

In one aspect of the present disclosure, the ballast 140*a* material possesses specific density and magnetization properties. Suitable materials include ferromagnetic materials such as iron (Fe), various grades of steel, cobalt (Co), iron oxide ($Fe_2O_3$), and neodymium-iron-boron alloy ($Nd_2Fe_{14}B$). The ballast can also be made from ceramic materials, including but not limited to ferrite ceramics, silica-based ceramics, alumina ($Al_2\Theta_3$), zirconia ($ZrO_2$), and various mineral-based ceramics.

In one aspect of the present disclosure, the manufacturing technique for the magnetic stir bar 101*a* includes core 110*a* and the oriented blade 120*a* may include, but is not limited to, injection molding, compression molding, computer numerical control (CNC) machining and additive manufacturing (AM) processes.

The additive manufacturing technique, often referred to as 3D printing, encompasses a variety of manufacturing processes wherein three-dimensional object are fabricated by selectively depositing or solidifying material in a layer-by-layer manner. Common additive manufacturing techniques suitable for fabricating the body 110*a* and the blade 120*a* include but are not limited to: a) fused deposition modeling (FDM), b) stereo-lithography (SLA), c) selective laser sintering (SLS), and d) binder jetting processes.

In one aspect of the present disclosure, the fused deposition modeling (FDM) technique is employed for manufacturing the core 110*a* and the blade 120*a*. FDM is and additive manufacturing process that precisely deposits thermoplastic material in a layer-by-layer fashion to create the desired three-dimensional object. The manufacturing process includes the following steps:

a) A computer-aided design (CAD) model of the magnetic stir bar 101*a* is generated and subsequently sliced into horizontal layers to generate a tool path, commonly referred to as g-code.

b) The 3D printer interprets the g-code and translates it into a series of coordinated movements of the extrusion nozzle, and build platform, facilitating the layer-by-layer deposition of the thermoplastic material.

c) The thermoplastic material, supplied in filament form, is fed into the extrusion nozzle, where it is heated beyond its melting point (Tm) and extruded onto the build platform or the previously deposited layer, where it cools, solidifies and bonds to form the subsequent layer of the outer shell.

d) This layer-by-layer deposition process is repeated until the entire outer shell, including the core 110*a* and the blade 120*a*, is fabricated according to the prescribed CAD model.

e) To fabricate the magnetic stir bar 101*a* having screw blade 120*a*, a customized g-code is prescribed to the 3D printer, enabling the enclosure of the magnet 130*a* within the core 110*a* and the blade 120*a* and the creation of specific shell design tailored to manipulate dynamic fluid motion for its intended purpose.

EXEMPLARY ASPECTS

The following examples are provided to illustrate various aspects of the present disclosure. These examples are intended to be illustrative and not limiting in nature. It should be understood by those skilled in the art that numerous variations, modifications, and alternative aspects are possible without departing from the spirit and scope of the present disclosure as defined by the specification and the claims. The examples described herein are non-exhaustive and serve to demonstrate the versatility and effectiveness of the present disclosure across diverse scenarios and applications. While specific configurations and parameters may be described, it is to be understood that these are exemplary in nature and that the present disclosure is not confined to the precise details set forth in these examples.

(1) Exemplary Aspect ii: Mixed-Flow Oriented Blade in Viscosity >500 Cp

Effective dispersion of reagents and additives in a high-viscosity liquid is crucial in industrial applications. The turnover rate serves as a quantitative indicator of how effectively mixing achieves an even distribution. CFD simulations were used to optimize the design; yielding a pumping capacity of 2.64 for aspect ii and 1.68 for a comparative conventional magnetic stir bar in 500 mL vessel.

Figure 10:
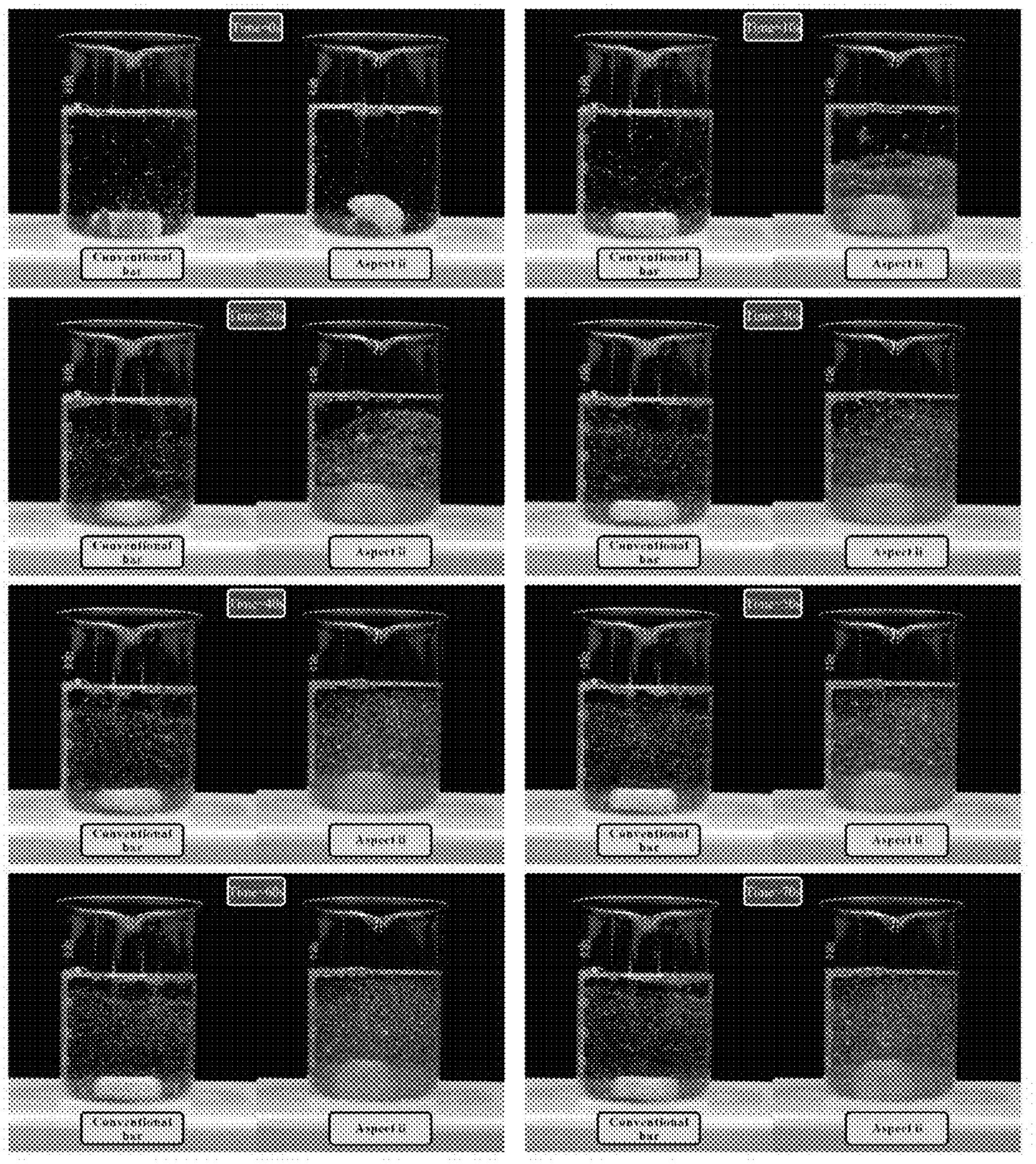
FIG. 10 is a depiction of a time-lapse comparison of stirring in a 250 ml vessel using a conventional bar-shaped magnetic stir bar and aspect ii at: (a) 0 (b) 10 (c) 20 (d) 30 (e) 40 (f) 50 (g) 60 (h) 70 seconds in aspect ii.

The experiment to evaluate dispersion efficiency in high-viscosity liquid was to place aspect ii from FIG. 1(*b*) (D=23 mm, H=16 mm) and a conventional magnetic stir bar (D=8 mm, L=24 mm) in 250 mL and 500 mL vessels (I.D.=66 mm and 83 mm) containing 200 and 400 mL of 99% glycerol, which had a viscosity of 848 cP, and 0.5 grams of glitter made from PVC material, to track particle trajectories and distributions. The magnetic stirring hot plate utilized was a Corning™ PC-420D to drive the magnetic stir bar. Aspect ii and the conventional magnetic stir bar were operated at 500 RPM to suspend the glitter into glycerol. FIG. 10. shows a time-lapse of the mixing process. The duration from the start of the mixing until the particles are uniformly dispersed in the glycerol is referred to as one turnover. The turnover rate is a measurement of mixing efficiency attributed to the design of a magnetic stir bar. Table 1 compares the turnover rates of the two magnetic stir bars, demonstrating their relative effectiveness.

TABLE 1

Turnover rate in 848 cP liquids at 250 mL and 500 mL vessel

| | | Conventional bar | | Aspect ii | |
|---|---|---|---|---|---|
| Experiment | Volume (mL) | Time required for turnover (s) | Turnover rate (turnover/hr) | Time required for turnover (s) | Turnover rate (turnover/hr) |
| A1 | 200 | 207 | 17.4 | 78 | 46.2 |
| A2 | 200 | 279 | 12.9 | 86 | 41.9 |
| A3 | 200 | 199 | 18.1 | 82 | 44.1 |
| B1 | 400 | 291 | 12.4 | 174 | 20.7 |
| B2 | 400 | 362 | 9.9 | 137 | 26.3 |
| B3 | 400 | 330 | 10.9 | 159 | 22.6 |

FIG. 10 demonstrates the particle distribution within a fixed volume of liquid using two different magnetic stir bars under identical conditions. Aspect ii, an oriented blade design, generates an upward axial flow that draws particles from the bottom towards the top. Conversely, the conventional magnetic stir bar induces a radial flow that pushes particles towards the edges of the vessel while drawing liquid downward from the spinning axis. As the viscosity of the liquid increases, the resistance to flow becomes more evident, and the effectiveness of two designs starts to become apparent in liquids of higher viscosity. In glycerol, the flow velocity generated by the conventional magnetic stir bar is very low around the bottom edges of the vessel. Consequently, particles accumulate in these low-velocity regions. Aspect ii did not observe such localized particles, and the particles were dispersed evenly throughout the vessel. The experimental setup, with all other variables controlled, shows that the observed differences in particle dispersion are attributable solely to the distinct flow dynamics generated by the two magnetic stir bars.

From CFD analysis, the pumping capacity of aspect ii is 1.6 times greater than that of the conventional magnetic stir bar. The actual experimental results, shown in Table 1 indicate that aspect ii achieved an average turnover rate of 44.1 turnovers per hour in 200 mL, which is 2.74 times higher than the conventional magnetic stir bar's 16.1 turnovers per hour in the same volume. In 400 mL, aspect ii achieved 23.2 turnovers per hour, which is 2.09 times higher than the conventional magnetic stir bar's 11.1 turnovers per hour. This difference in turnover rate underscores the effectiveness of the design of aspect ii. The screw blade design of aspect ii optimizes flow behavior across a wider range of viscosity compared to the conventional magnetic stir bar. This feature enables efficient and uniform particle dispersion while maintaining higher turnover rates, even in larger volumes with high viscosity liquids. Aspect ii demonstrated enhanced performance in dispersion applications.

(2) Exemplary Aspect iii: High-Shear Oriented Blade

Aspect iii from FIG. 1(*b*) of the present disclosure relates to magnetic stir bars and methods for producing high-quality emulsions characterized by small, homogeneously distributed droplet sizes. This is achieved through high shear geometries and higher rotating speeds. Design was optimized through CFD simulations, yielding shear rates of 20.351 $s^{-1}$ for aspect iii from FIG. 1(*b*) of the present disclosure and 11.0905 $s^{-1}$ for a comparative double-ended magnetic stir bar.

The experiment to evaluate emulsifying efficiency was to place aspect iii (D=40 mm, H=16 mm) versus a double-ended magnetic stir bar (D=8 mm, L=35 mm) in a 1 L vessel (I.D.=108.2 mm) containing 900 g of 0.4% sodium lauryl sulfate (SLS) surfactant and 100 g of soybean oil. The magnetic stirring hot plate utilized was a Corning™ PC-420D to drive the magnetic stir bar. The double-ended magnetic stir bar operated at 400 RPM (the maximum allowable speed for its design) and aspect iii operated at 800 RPM (enabled by its improved high RPM stability) were used to emulsify the oil-water mixture. 2 mL oil droplets were sampled at regular intervals from 0.25, 0.5, 0.75, 1, 3, 5, 7, 9, 11, 13, 15, 17, 19, 21, 23, 25, 27, 29, and 31 minutes, at a distance of 100 mm from the spinning center and 50 mm below the liquid surface. ImageJ™ software analyzed the size of 300 droplets per sampling; results are presented in Table 2.

TABLE 2

Oil droplet size evolution in emulsion reaction.

| Time interval (minutes) | Double-ended oil droplet size (μm) | RSD* (%) | Aspect iii oil droplet size (μm) | RSD* (%) |
|---|---|---|---|---|
| 0.25 | 387.7 ± 132.0 | 29.0 | 357.2 ± 103.7 | 34.3 |
| 0.5 | 403.1 ± 126.4 | 55.1 | 255.4 ± 140.7 | 31.4 |
| 0.75 | 352.7 ± 101.5 | 29.2 | 213.3 ± 62.2 | 28.8 |
| 1 | 301.1 ± 71.2 | 33.7 | 168.5 ± 56.8 | 23.6 |
| 3 | 296.9 ± 104.8 | 33.1 | 132.5 ± 43.9 | 35.3 |
| 5 | 231.4 ± 62.2 | 34.2 | 124.7 ± 42.7 | 26.9 |
| 7 | 255.7 ± 120.4 | 31.0 | 115.8 ± 35.9 | 47.1 |
| 9 | 283.1 ± 114.8 | 28.8 | 121.8 ± 35.0 | 40.6 |
| 11 | 347.9 ± 126.7 | 35.6 | 88.3 ± 31.4 | 36.4 |
| 13 | 299.2 ± 128.3 | 33.4 | 76.6 ± 25.6 | 42.9 |
| 15 | 261.2 ± 112.4 | 28.0 | 73.0 ± 20.5 | 43.0 |
| 17 | 280.7 ± 86.3 | 25.3 | 72.6 ± 18.3 | 30.7 |
| 19 | 251.0 ± 93.7 | 36.8 | 64.7 ± 23.8 | 37.3 |
| 21 | 204.0 ± 74.4 | 28.2 | 65.1 ± 18.4 | 36.5 |
| 23 | 258.5 ± 81.8 | 26.7 | 54.3 ± 14.5 | 31.7 |
| 25 | 214.3 ± 77.4 | 33.4 | 49.3 ± 16.5 | 36.1 |

TABLE 2-continued

Oil droplet size evolution in emulsion reaction.

| Time interval (minutes) | Double-ended oil droplet size (μm) | RSD* (%) | Aspect iii oil droplet size (μm) | RSD* (%) |
|---|---|---|---|---|
| 27 | 256.1 ± 92.3 | 28.9 | 64.8 ± 18.7 | 36.0 |
| 29 | 228.2 ± 71.8 | 28.0 | 70.3 ± 19.7 | 31.5 |
| 31 | 260.8 ± 88.9 | 29.8 | 59.1 ± 17.6 | 34.1 |

*RSD: relative standard deviation

After 31 minutes of mixing, aspect iii produced droplets with an average size of 60 μm, while the double-ended magnetic stir bar yielded droplets with an average size of 220 μm. This significant difference in droplet size highlights the impact of shear rate on emulsion quality. Aspect iii's higher shear rate effectively broke down the oil droplets into much smaller sizes, enhancing the emulsion's stability and uniformity. The double-ended magnetic stir bar's lower shear rate resulted in larger, less effective droplets. Aspect iii demonstrates superior efficiency in producing fine emulsions due to its enhanced shear performance compared to conventional stirring devices.

(3) Exemplary Aspect v: Precession Motion Mixing

Gold nanoparticles (AuNPs) have found significant commercial applications in catalysis, medical, and electronic industries since 2013. However, the synthesis of AuNPs faces challenges in achieving precise size and shape control, due to the inherent tendency of nanoparticles to agglomerate. Efficient, vigorous mixing is critical for obtaining reproducible results.

This exemplary aspect of the present disclosure compares the mixing efficiency of the present disclosure, aspect v from FIG. 1(*b*) (D=7 mm, L=24 mm), against a conventional rod-shaped magnetic stir bar (D=6 mm, L=15 mm). The AuNPs were synthesized in 30 mL glass vials using the Brust-Schiffrin method on an AsONE™ model CHPS-170DF magnetic stir plate. Aspect v demonstrated a stable stirring capability at 1050 revolutions per minute (RPM), whereas the conventional magnetic stir bar was stable only up to 600 RPM.

The Brust-Schiffrin synthesis method proceeds as follows: hydrogen tetrachloroaurate (III) hydrate (4.0 g, 1 equivalent) was dissolved in ultra-pure deionized (DI) water and stirred at the respective RPM for 5 minutes. A stock solution of tetra-n-octyl ammonium bromide (8.2 g, 1.5 equivalents) was then added drop-wise to the solution while stirring at the respective RPM for 15 minutes. Subsequently, 1-pentanethiol (2.6 g, 2 equivalents) was added drop-wise over 15 minutes. A stock solution of sodium borohydride (8.0 g, 20 equivalents) in ultra-pure DI water was then rapidly added. The resulting solution was stirred for 4 hours, after which the synthesized AuNPs are purified. The size of the synthesized AuNPs was confirmed by transmission electron microscopy (TEM).

Figure 11:
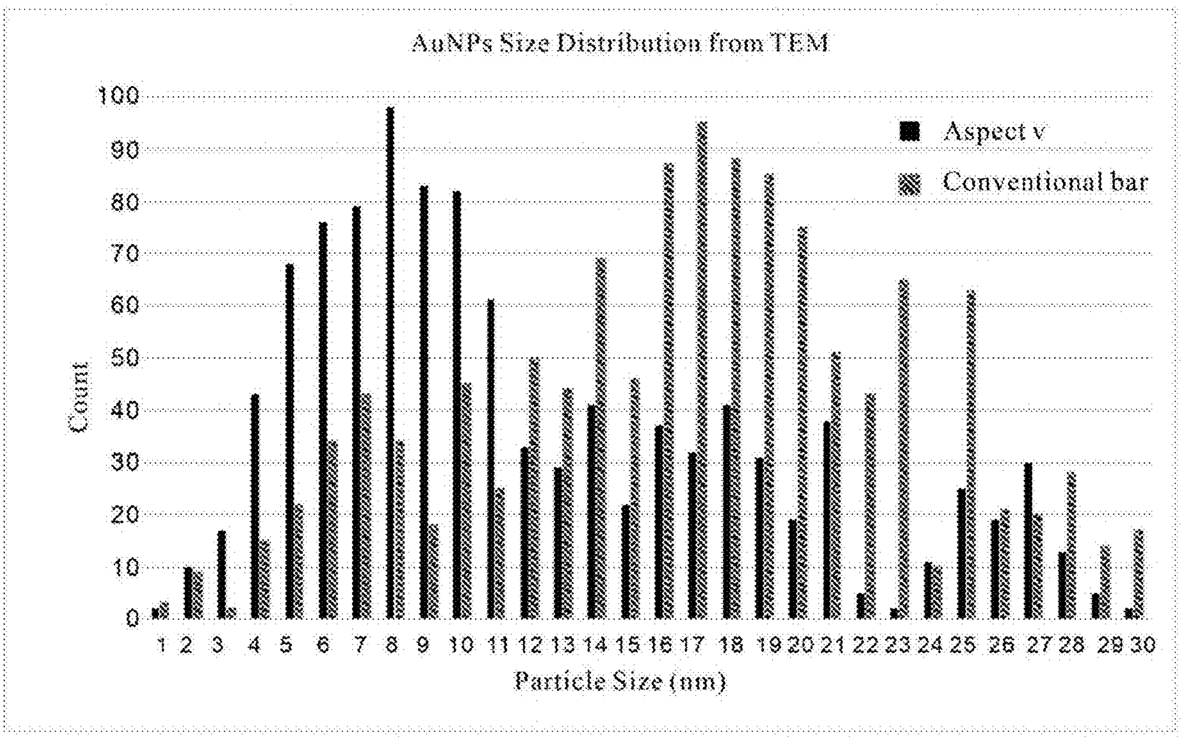
FIG. 11 is a Transmission Electron Microscopy (TEM) analyzed the size distribution of gold nanoparticles (AuNPs) in aspect v.

The TEM particle analysis, the results of which are shown in FIG. 11, revealed that the reaction stirred using aspect v yielded smaller AuNPs compared to the reaction stirred by the conventional magnetic stir bar. The number-average particle size for aspect v was 11.4 nm, while for the conventional magnetic stir bar, the number-average particle size was 19.4 nm. Increased fluid velocity and high turbulent flow reduced the agglomeration, yielding smaller AuNPs with a more evenly distributed particle size distribution.

(4) Exemplary Aspect i: Mixing in Thick Suspensions

Friedel's salt has gained prominent attention in the adsorption technology for reducing heavy metal contaminants in wastewater, however its synthesis process is challenging. The success of Friedel's salt crystal, $Ca_2Al(OH)_6$, $(Cl,OH)\cdot 2H_2O$, formation depends on the distribution of the elements in the process of forming stable nuclei of homogeneous size. The presence of hydroxyls after the addition of NaOH into the mixture generate $CaAl_2(OH)_6^+$ to bond with Cl,OH and $H_2O$ producing the two-layer-hydroxide structure, this reduce the solubility of the suspension, making the nuclei to settle to the bottom of the vessel. Inadequate mixing can prevent the nuclei and unreacted elements to form the desired product. Consequently, a portion of the reagent transforms into by product compounds like lime, mayenite, or caustic lime.

To solve this problem, aspect i from FIG. 1(*b*) of the present disclosure was desirable to provide sufficient shear rate to move through the thickness of the suspension and disrupt the sedimentation. The multi-blade feature with rotational movement dredges the sedimented particle and precession movement transport the nuclei to contact with the rest of Ca and Al elements in the suspension.

To prove this concept, an experiment is conducted to evaluate the usage efficiency of two different magnetic stir bars in this thick suspension. Involving an oval shaped magnetic stir bar (L=34 mm, D=11 mm) and the present aspect of a magnetic stir bar 101*a* referred to in FIG. 1(*a*) (L=50 mm, D=16 mm), mentioned as aspect i.

The synthesis method applied is co-precipitation technique, where a 2:1 ratio of calcium chloride ($CaCl_2$) and aluminum chloride ($AlCl_3$) is dissolved in water, followed by the gradual addition of a sodium hydroxide (NaOH) solution under constant stirring to maintain a pH of around 9 to 11.5. The mixture is then aged in the mother solution at 90° C. for 48 hours. The precipitate is subsequently washed, filtered to remove any unreacted reagents, and then dried at 90° C. for 5 hours. The successful synthesis of Friedel's salt was pulverized and sieved with 100 mesh prior to X-ray diffraction (XRD) pattern analysis.

Figure 12:
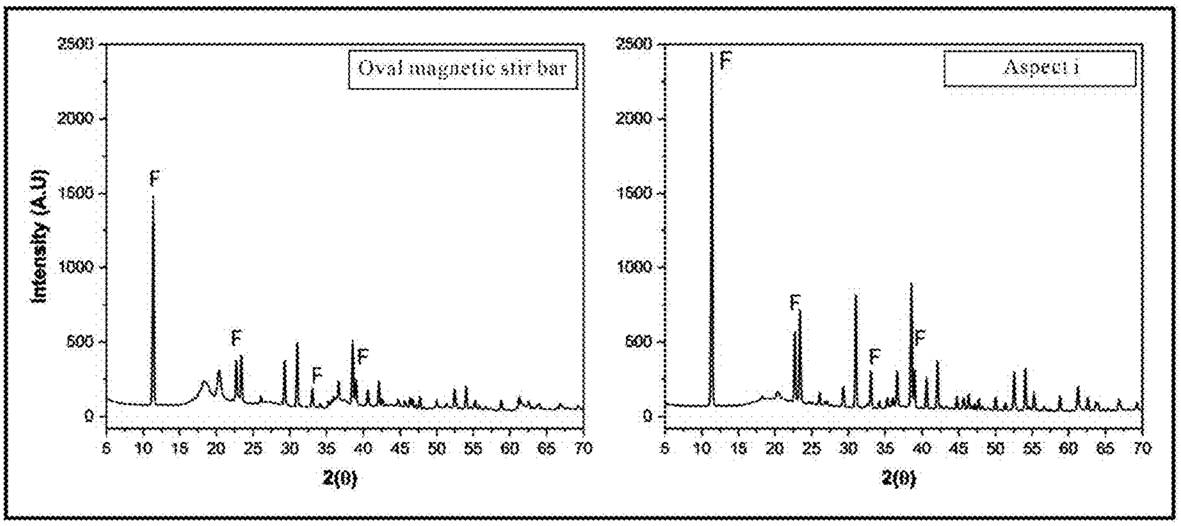
FIG. 12 is an analysis of the X-ray diffraction (XRD) pattern in aspect i.

FIG. 12, the XRD plot for both samples indicate consistent data quality for the basic phases of Friedel's salt, as shown by the background signal and noise levels in both patterns, which were relatively similar. And both pictures show the corresponding peak to Friedel' salt which are 11.2°, 22.5°, 34.0°, 39.6°, and 46.0°. The mixing method was observed to have a significant impact on the material's crystallinity. The sufficient mixing by aspect i yielded a more crystalline material with larger crystallites as evidenced by the sharper and more intense diffraction peaks. In contrast, the sample mixed with the oval magnetic stir bar shows broader peaks, suggesting smaller crystallites. It can be concluded that the application of aspect i improved the formation of Friedel's salt crystals as evident from increased intensity of the crystalline structure.

(5) Exemplary Aspect iv: Dissolution Rate in Mixing

The present disclosure addresses a common challenge in the coatings and adhesives industry, specifically the time-consuming process of polymer dissolution in solution casting applications. Conventional methods typically require 2 to 6 hours for complete dissolution, disrupting workflow. The rate of polymer dissolution is directly related to the frequency of interaction between the polymer and the surrounding solvent. Aspect iv from FIG. 1(*b*) of the present disclosure incorporates a design that generates a turbulent flow pattern that suppresses vortex formation, enabling operation at higher rotation while mitigating the risk of air entrapment.

The experiment to evaluate dissolution rate was to place aspect iv (L=36 mm, H=11 mm) and a conventional magnetic stir bar (L=25 mm, D=8 mm) in a 250 mL Erlenmeyer flask (maximum D=85 mm) containing 100 g of n-hexane and 0.5 g of NdBR (KIBIPOL™ PR-060). The magnetic stirring hot plate utilized was an IKA™ C-MAG HS 7 to drive the magnetic stir bars. Aspect iv and the conventional magnetic stir bar were operated at 600 RPM and 500 RPM, respectively, to dissolve the NdBR into n-hexane at 60° C. After 100 minutes of mixing, 35 g of the solution was transferred into a sample vial (D=40 mm, H=75 mm) and place on the hot plate to remove the solvent at 85° C. Once all the solvent has evaporated to constant weight, the dissolved polymer weight is the final weight of the vial subtracted from the tare weight of the vial. The weight was measured using a SHIMADZU™ MOC63u with three decimal points of precision, then divided by 100 minutes to determine the rate of dissolution, as shown in Table 3.

TABLE 3

The rate of dissolution of NdBR in n-hexane
The rate of dissolution

| Experiment | Conventional bar (mg/min) | Aspect iv (mg/min) |
|---|---|---|
| C1 | 0.58 | 1.11 |
| C2 | 0.61 | 1.03 |
| C3 | 0.46 | 1.20 |
| Average | 0.55 | 1.11 |

The results of the experiment demonstrate an improvement in the dissolution rate with aspect iv. The conventional magnetic stir bar achieved an average dissolution rate of 0.55 mg/min, whereas aspect iv achieved an average dissolution rate of 1.11 mg/min, representing a 101.8% increase in dissolution efficiency. Aspect iv enhances the efficiency of polymer dissolving in solution casting applications by generating a chaotic flow pattern that suppresses vortex formation, enabling operation at higher rotation speeds while minimizing air entrapment. This improvement has practical implications for reducing the time required for polymer dissolution in the coatings and adhesives industry.

The examples described herein are illustrative and non-exhaustive. One of ordinary skill in the art may recognize that numerous further combinations and permutations of the present specifications are possible. Each of the aspects of the present disclosure described above may be in combination in any permutation to define the aspects disclosed herein. Not all elements are necessary in every aspect, and additional elements beyond those described may be included within the scope of the present disclosure. The specification and drawings are to be regarded in an illustrative rather than a restrictive sense.

Clause 1: A magnetic stir bar including: a core, the core having a head and a tail, wherein the head and tail are on opposite ends of the core; a rotational axis, wherein the rotational axis runs along the center of the core, running through the head and the tail; at least one magnet, wherein the at least one magnet is located within the core; and at least one oriented blade connected to the core, wherein the orientation of the at least one oriented blade is either left-handed, right-handed, or straight, wherein the at least one oriented blade has an intake zone, a transport zone, and a discharge zone, wherein the transport zone is situated between the intake zone and the discharge zone; wherein the angle between the intake zone of the at least one oriented blade and the rotational axis is in the range of about 0° to about 900 or about −0° to about −90°; the angle between the transport zone of the at least one oriented blade and the rotational axis is in the range of about 0° to about 90° or about −0° to about −90°; and the angle between the discharge zone of the at least one oriented blade and the rotational axis is in the range of about 0° to about 90° or about −0° to about −90°.

Clause 2: The magnetic stir bar of clause 1, wherein the angle between the intake zone of the at least one oriented blade and the rotational axis is in the range of about 100 to about 700 or about −10° to about −70°; the angle between the transport zone of the at least one oriented blade and the rotational axis is in the range of about 15° to about 80° or about −15° to about −80°; and the angle between the discharge zone of the at least one oriented blade and the rotational axis is in the range of about 200 to about 890 or about −20° to about −89°.

Clause 3: The magnetic stir bar of clause 1, wherein the angle between the intake zone of the at least one oriented blade and the rotational axis is in the range of about 300 to about 600 or about −30° to about −60°; the angle between the transport zone of the at least one oriented blade and the rotational axis is in the range of about 370 to about 650 or about −37° to about −65°; and the angle between the discharge zone of the at least one oriented blade and the rotational axis is in the range of about 450 to about 700 or about −450 to about −70°.

Clause 4: The magnetic stir bar of clause 1, wherein the core further includes a ballast, wherein the ballast is made of a ferromagnetic material that does not interfere with the magnetic stir bar's magnetic coupling to a driver magnet during operation.

Clause 5: The magnetic stir bar of clause 1, wherein the at least one oriented blade has a variable pitch along its length.

Clause 6: The magnetic stir bar of clause 1, wherein the orientation of the at least one blade is either left-handed or right-handed.

Clause 7: The magnetic stir bar of clause 1, wherein the magnetic stir bar is a magnetic impeller.

Clause 8: The magnetic stir bar of clause 1, wherein the at least one oriented blade includes two or more oriented blades.

Clause 9: magnetic stir bar of clause 8, wherein each of the two or more oriented blades have a variable pitch that is independently configurable.

Clause 10: A method of providing consistent stirring of fluid, providing: a plurality of vessels, each containing a magnetic stir bar configured to rotate about a rotational axis, wherein the magnetic stir bar may spin on the same axis as or on a tilted axis to a stirring axis of the magnetic stir plate; positioning the vessels containing the magnetic stir bars on a single magnetic stir plate, wherein the vessels are arranged within the operational range of a driver magnet contained within the magnetic stir plate; powering on the magnetic stir plate to rotate the driver magnet, thereby inducing a uniform rotation behavior of the magnetic stir bar in their respective vessels within the entirety of effective area of the driver magnet; and generating a mixed-flow pattern within each vessel across the magnetic stir plate, wherein the rotation of each magnetic stir bar does not interfere with the rotation of other magnetic stir bars in the adjacent vessels, allowing for simultaneous, consistent, and multi-vessel stirring across multiple vessels positioned on the same magnetic stir plate.

Clause 11: The method of clause 10, wherein the magnetic stir bar is the magnetic stir bar of clause 1.

Clause 12: The method of clause 11, wherein when the rotational axis is tilted relative to the stirring axis of the magnetic stir plate, the rotational axis and the stirring axis are non-colinear, and the magnetic stir bar exhibits a secondary dual-axis motion characterized as a precession motion, wherein the angle between the rotational axis and the stirring axis is about 0° to about 90°.

Clause 13: The method of clause 12, wherein the angle between the rotational axis and the stirring axis is 0° to about 250 or from about 220 to about 65° and from about 40° to about 90°.

Clause 14: The method of clause 11, wherein the at least one oriented blade is modifiable to accommodate specific vessel shapes.

Clause 15: The method of clause 11, wherein the core further includes a ballast, wherein the ballast is made of a ferromagnetic material that does not interfere with the magnetic stir bar's magnetic coupling to the driver magnet during operation.

Clause 16: The method of clause 11, wherein the at least one oriented blade has a variable pitch along its length.

Clause 17: The method of clause 11, wherein the orientation of the at least one blade is either left-handed or right-handed.

Clause 18: The method of clause 11, wherein the magnetic stir bar includes two or more oriented blades.

Clause 19: The method of clause 18, wherein each of the two or more oriented blades has a variable pitch that is independently configurable.

Clause 20: A magnetic stir bar including: a core, the core having a head and a tail, wherein the head and tail are on opposite ends of the core; a rotational axis, wherein the rotational axis runs along the center of the core, running through the head and the tail; at least one magnet, wherein the at least one magnet is located within the core; and two or more blades connected to the core, wherein the orientation of the two or more oriented blades is either left-handed or right-handed, wherein the two or more oriented blades have an intake zone, a transport zone, and a discharge zone, wherein the transport zone is situated between the intake zone and the discharge zone, wherein the angle between the intake zone of each of the two or more oriented blades and the rotational axis is in the range of about 300 to about 600 or about −30° to about −60°; the angle between the transport zone of each of the two or more oriented blades and the rotational axis is in the range of about 370 to about 650 or about −37° to about −65°; and the angle between the discharge zone of each of the two or more oriented blades and the rotational axis is in the range of about 450 to about 700 or about −450 to about −70°; the core further includes a ballast, wherein the ballast is made of a ferromagnetic material that does not interfere with the magnetic stir bar's magnetic coupling to the driver magnet during operation; the two or more oriented blades have a variable pitch along its length; and each of the two or more oriented blades has a variable pitch that is independently configurable.

What is claimed is:

1. A magnetic stir bar comprising:

a core, the core having a head and a tail, wherein the head and tail are on opposite ends of the core, and wherein the head and tail are closed at their respective ends;

a rotational axis, wherein the rotational axis runs along the center of the core, running through the head and the tail;

at least one magnet, wherein the at least one magnet is located within the core, wherein the at least one magnet is designed to couple with a driver magnet of a magnetic stir plate;

a stirring axis, wherein the stirring axis runs orthogonal to the rotation of the driver magnet, and wherein the stirring axis and the rotational axis are not collinear; and at least one oriented blade connected to the core, wherein the orientation of the at least one oriented blade is either left-handed, right-handed, or straight, wherein the at least one oriented blade has an intake zone, a transport zone, and a discharge zone, wherein the transport zone is situated between the intake zone and the discharge zone; wherein an angle between the intake zone of the at least one oriented blade and the rotational axis is in the range of about 5° to about 90° or about −5° to about −90°;

an angle between the transport zone of the at least one oriented blade and the rotational axis is in the range of about 5° to about 90° or about −5° to about −90°; and an angle between the discharge zone of the at least one oriented blade and the rotational axis is in the range of about 5° to about 90° or about −5° to about −90°, wherein the magnetic stir bar is configured for stable behavior while exceeding a rotational speed about the rotational axis above about 600 RPM while undergoing a secondary rotational movement about the stirring axis, wherein the stirring axis and the rotational axis are not parallel, and wherein an angle between the rotational axis and the stirring axis is about 22° to about 90°.

2. The magnetic stir bar of claim 1, wherein the angle between the intake zone of the at least one oriented blade and the rotational axis is in the range of about 10° to about 70° or about −10° to about −70°;

the angle between the transport zone of the at least one oriented blade and the rotational axis is in the range of about 15° to about 80° or about −15° to about −80°; and the angle between the discharge zone of the at least one oriented blade and the rotational axis is in the range of about 20° to about 89° or about −20° to about −89°.

3. The magnetic stir bar of claim 1, wherein the angle between the intake zone of the at least one oriented blade and the rotational axis is in the range of about 30° to about 60° or about −30° to about −60°;

the angle between the transport zone of the at least one oriented blade and the rotational axis is in the range of about 37° to about 65° or about −37° to about −65°; and the angle between the discharge zone of the at least one oriented blade and the rotational axis is in the range of about 45° to about 70° or about −45° to about −70°.

4. The magnetic stir bar of claim 1, wherein the core further comprises a ballast, wherein the ballast is made of a ferromagnetic material, wherein the ferromagnetic material does not interfere with the magnetic stir bar's magnetic coupling to a driver magnet during operation.

5. The magnetic stir bar of claim 1, wherein the at least one oriented blade has a variable pitch along its length.

6. The magnetic stir bar of claim 1, wherein the orientation of the at least one blade is either left-handed or right-handed.

7. The magnetic stir bar of claim 1, wherein the magnetic stir bar further comprises a magnetic impeller.

8. The magnetic stir bar of claim 1, wherein the angle between the rotational axis and the stirring axis is from about 22° to about 65°.

9. The magnetic stir bar of claim 1, wherein the at least one oriented blade comprises two or more oriented blades.

10. The magnetic stir bar of claim 9, wherein each of the two or more oriented blades have a variable pitch that is independently configurable.

11. A method of providing consistent stirring of fluid, the method comprising the steps of:

providing a plurality of vessels, each containing a magnetic stir bar configured to rotate about a rotational axis, wherein the magnetic stir bar is capable of spinning on a tilted axis to a stirring axis of a magnetic stir plate, wherein the magnetic stir plate has only one driver magnet;

positioning the vessels containing the magnetic stir bars on the magnetic stir plate, wherein the vessels are arranged anywhere within an operational range of the driver magnet contained within the magnetic stir plate;

powering on the magnetic stir plate to rotate the driver magnet about the stirring axis, thereby inducing a uniform rotation behavior of the magnetic stir bars in their respective vessels within an entirety of effective area of the driver magnet, wherein each magnetic stir bar rotates about the rotational axis, wherein the rotational axis and the stirring axis are not colinear;

generating a mixed-flow pattern within each vessel across the magnetic stir plate, wherein the rotation of each magnetic stir bar does not interfere with the rotation of other magnetic stir bars in the adjacent vessels, allowing for simultaneous, consistent, and multi-vessel stirring across multiple vessels positioned on the same magnetic stir plate; and stirring the fluid in such a way as to inhibit the formation of vortices within the fluid, wherein each magnetic stir bar is configured for stable behavior while exceeding a rotational speed about the rotational axis above about 600 RPM while undergoing a secondary rotational movement about the stirring axis.

12. The method of claim 11, wherein each magnetic stir bar comprises the magnetic stir bar of claim 1.

13. The method of claim 12, wherein the at least one oriented blade is modifiable to accommodate specific vessel shapes.

14. The method of claim 12, wherein the core further comprises a ballast, wherein the ballast is made of a ferromagnetic material, wherein the ferromagnetic material does not interfere with each magnetic stir bar's magnetic coupling to the driver magnet during operation.

15. The method of claim 12, wherein the at least one oriented blade has a variable pitch along its length.

16. The method of claim 12, wherein the orientation of the at least one blade is either left-handed or right-handed.

17. The method of claim 12, wherein each magnetic stir bar comprises two or more oriented blades.

18. The method of claim 17, wherein each of the two or more oriented blades has a variable pitch that is independently configurable.

19. A magnetic stir bar comprising:

a core, the core having a head and a tail, wherein the head and tail are on opposite ends of the core, and wherein the head and tail are closed at their respective ends;

a rotational axis, wherein the rotational axis runs along the center of the core, running through the head and the tail;

at least one magnet, wherein the at least one magnet is located within the core, wherein the at least one magnet is designed to couple with a driver magnet of a magnetic stir plate;

a stirring axis, wherein the stirring axis runs orthogonal to the rotation of the driver magnet, wherein the stirring axis and the rotational axis are not collinear and not parallel, wherein the angle between the rotational axis and the stirring axis is from about 22° to about 65°; and two or more oriented blades connected to the core, wherein the orientation of the two or more oriented blades is either left-handed or right-handed, wherein the two or more oriented blades have an intake zone, a transport zone, and a discharge zone, wherein the transport zone is situated between the intake zone and the discharge zone, wherein an angle between the intake zone of each of the two or more oriented blades and the rotational axis is in the range of about 30° to about 60° or about −30° to about −60°;

an angle between the transport zone of each of the two or more oriented blades and the rotational axis is in the range of about 37° to about 65° or about −37° to about −65°; and an angle between the discharge zone of each of the two or more oriented blades and the rotational axis is in the range of about 45° to about 70° or about −45° to about −70°;

the core further comprises a ballast, wherein the ballast is made of a ferromagnetic material that does not interfere with the magnetic stir bar's magnetic coupling to the driver magnet during operation;

the two or more oriented blades have a variable pitch along their length; and the variable pitch of each of the two or more oriented blades is independently configurable, wherein the magnetic stir bar is configured for stable behavior while exceeding a rotational speed about the rotational axis above about 600 RPM while undergoing a secondary rotational movement about the stirring axis.

* * * * *